(12) United States Patent
Shi et al.

(10) Patent No.: US 12,270,677 B2
(45) Date of Patent: Apr. 8, 2025

(54) MAP DATA PROCESSING METHOD AND DEVICE, COMPUTER EQUIPMENT, AND STORAGE MEDIUM

(71) Applicant: Tencent Technology (Shenzhen) Company Limited, Guangdong (CN)

(72) Inventors: Hongyu Shi, Shenzhen (CN); Zhongzhen Pan, Shenzhen (CN); Yuanyuan Li, Shenzhen (CN); Bo Guo, Shenzhen (CN); Xiao Sun, Shenzhen (CN); Yitong Du, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 265 days.

(21) Appl. No.: 17/989,014

(22) Filed: Nov. 17, 2022

(65) Prior Publication Data
US 2023/0071236 A1    Mar. 9, 2023

Related U.S. Application Data

(63) Continuation of application No. PCT/CN2022/074699, filed on Jan. 28, 2022.

(30) Foreign Application Priority Data

Feb. 3, 2021    (CN) .......................... 202110150854.8

(51) Int. Cl.
*G01C 21/30*    (2006.01)
*G01C 21/00*    (2006.01)
(Continued)

(52) U.S. Cl.
CPC ......... *G01C 21/3815* (2020.08); *G01C 21/32* (2013.01); *G01C 21/367* (2013.01); *G01C 21/3878* (2020.08)

(58) Field of Classification Search
CPC ............ G01C 21/3815; G01C 21/3878; G01C 21/32; G01C 21/367
See application file for complete search history.

(56) References Cited

U.S. PATENT DOCUMENTS

| 2006/0111837 | A1* | 5/2006 | Tauchi | ............... | G01C 21/3837 |
| | | | | | 340/995.12 |
| 2011/0279452 | A1* | 11/2011 | Ibe | ....................... | G09B 29/007 |
| | | | | | 345/419 |

FOREIGN PATENT DOCUMENTS

| CN | 103185600 A | 7/2013 |
| CN | 105893577 A | 8/2016 |

(Continued)

OTHER PUBLICATIONS

International Search Report and Written Opinon for priority application No. PCT/CN2022/074699 dated Apr. 14, 2022, 7p, in Chinese language.

(Continued)

*Primary Examiner* — Yufeng Zhang
(74) *Attorney, Agent, or Firm* — Crowell & Moring LLP

(57) ABSTRACT

Embodiments of this disclosure discloses a map data processing method, apparatus, computer device and storage medium, the method including: outputting navigation route information associated with a navigation user in a navigation interface of a map client application, the navigation interface including map layer information, the navigation route information being superimposed and displayed on the map layer information, and map field information of the map layer information being first field information; obtaining location information of the navigation user on the navigation route information; and updating and displaying the map field information from the first field information to second field information in the navigation interface when the location information is monitored to be in an intersection area on the (Continued)

navigation route information. By the embodiments of this disclosure, the safety during navigation may be improved.

18 Claims, 11 Drawing Sheets

(51) Int. Cl.
    *G01C 21/32*     (2006.01)
    *G01C 21/36*     (2006.01)

(56) References Cited

FOREIGN PATENT DOCUMENTS

| | | |
|---|---|---|
| CN | 106289303 A | 1/2017 |
| CN | 110926487 A | 3/2020 |
| CN | 112988927 A | 6/2021 |
| JP | 2004-117264 A | 4/2004 |
| WO | WO 2022/166823 A1 | 8/2022 |

OTHER PUBLICATIONS

English language translation of the International Search Report for priority application No. PCT/CN2022/074699 dated Apr. 14, 2022, 2p.

Concise Explanation of Relevance for the Written Opinion.

* cited by examiner

MAP DATA PROCESSING METHOD AND DEVICE, COMPUTER EQUIPMENT, AND STORAGE MEDIUM

RELATED APPLICATION

This application is a continuation of International Patent Application No. PCT/CN2022/074699, field on Jan. 28, 2022, which claims priority, Patent Application No. 202110150854.8, entitled "MAP DATA PROCESSING METHOD, APPARATUS, COMPUTER DEVICE AND STORAGE MEDIUM" filed with the China Patent Office on Feb. 3, 2021, which Data by reference in its entirety. The entireties of the above applications are incorporated by reference.

TECHNICAL FIELD

This disclosure relates to the field of computer technology, and in particular relates to map data processing.

BACKGROUND

Currently in a navigation scenario, when a navigation user goes to a certain place, a user terminal (that is, a navigation device) installed with a map client application can be used to determine navigation route information, and output map data associated with the navigation route information in a navigation interface of the map client application. The map data displayed in the navigation interface of the map client application is often determined based on the location information of the navigation user. In other words, when the navigation user arrives at a navigation intersection, the navigation interface will display the information of the road where the navigation user will pass after passing through the navigation intersection, and thus the navigation user cannot learn the subsequent road information (e.g., turning information) in advance.

When the navigation user wants to obtain the subsequent road information, the navigation user needs to manually operate the map data in the navigation interface (e.g., manually drag map layer information), which means that the manual operation will consume a certain time for human-computer interaction, resulting in that there are certain safety hazards during the driving process, and the safety of navigation is reduced.

SUMMARY

In view of this, the embodiments of this disclosure provide a map data processing method, apparatus, computer device and storage medium, which may improve safety during navigation.

An aspect of the embodiments of this disclosure provides a map data processing method, performed by a computer device, and including:

presenting navigation route information associated with a navigation user in a navigation interface of a user terminal, wherein the navigation interface presents map layer information, the map layer information includes map field information as first field information, the navigation route information is superimposed and displayed on the map layer information;

obtaining location information of the navigation user in association with the navigation route information; and updating and displaying the map field information from the first field information to second field information in the navigation interface when the location information is detected to be in an intersection area on the navigation route information, wherein the second field information presents additional map data associated with the navigation route information than the first field information, and the map data in the second field information comprising road information of the route information after the intersection area.

An aspect of the embodiments of this disclosure provides a map data processing apparatus, including:

a navigation route output module, configured to output navigation route information associated with a navigation user in a navigation interface of a map client application, the navigation interface including map layer information, the navigation route information being superimposed and displayed on the map layer information, and map field information of the map layer information being first field information;

a location obtaining module, configured to obtain location information of the navigation user on the navigation route information; and a field updating module, configured to update and display the map field information from the first field information to second field information in the navigation interface when the location information is monitored to be in an intersection area on the navigation route information, the second field information showing more map data associated with the navigation route information than the first field information, and the map data in the second field information including road information after the intersection area is passed through on the navigation route information.

An aspect of the embodiments of this disclosure provides a computer device, including: a processor and a memory, the processor being connected to the memory, the memory being configured to store a computer program, and the computer program, when executed by the processor, causing the computer device to perform the method according to the embodiments of this disclosure.

An aspect of the embodiments of this disclosure provides a non-transitory computer-readable storage medium, storing a computer program, the computer program being loaded and executed by a processor, to cause a computer device with the processor to perform the method according to the embodiments of this disclosure.

An aspect of the embodiments of this disclosure provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the method according to the embodiments of this disclosure.

In the embodiments of this disclosure, when the navigation user needs navigation, the computer device (e.g., a user terminal) installed with the map client application may output the navigation route information associated with the navigation user in the navigation interface of the map client application. Further in another aspect, the computer device may obtain the location information of the navigation user on the navigation route information in real time, so as to monitor whether the location information is in an intersection area on the navigation route information. The location information being in the intersection area means that the navigation user is about to arrive at a navigation intersection corresponding to the intersection area. At this time, the computer device needs to adjust the map field information of the map layer information in the navigation interface, so as to update the map field information from the first field information to the second field information. Therefore, when the navigation user is about to arrive at the intersection, the computer device may automatically update and display the map field information without manual operation of the navigation user, such that more map data associated with the navigation route information may be displayed, the navigation user may obtain the information of the road where he/she will pass later, and the safety during navigation is improved.

DESCRIPTION OF EMBODIMENTS

Figure 1:
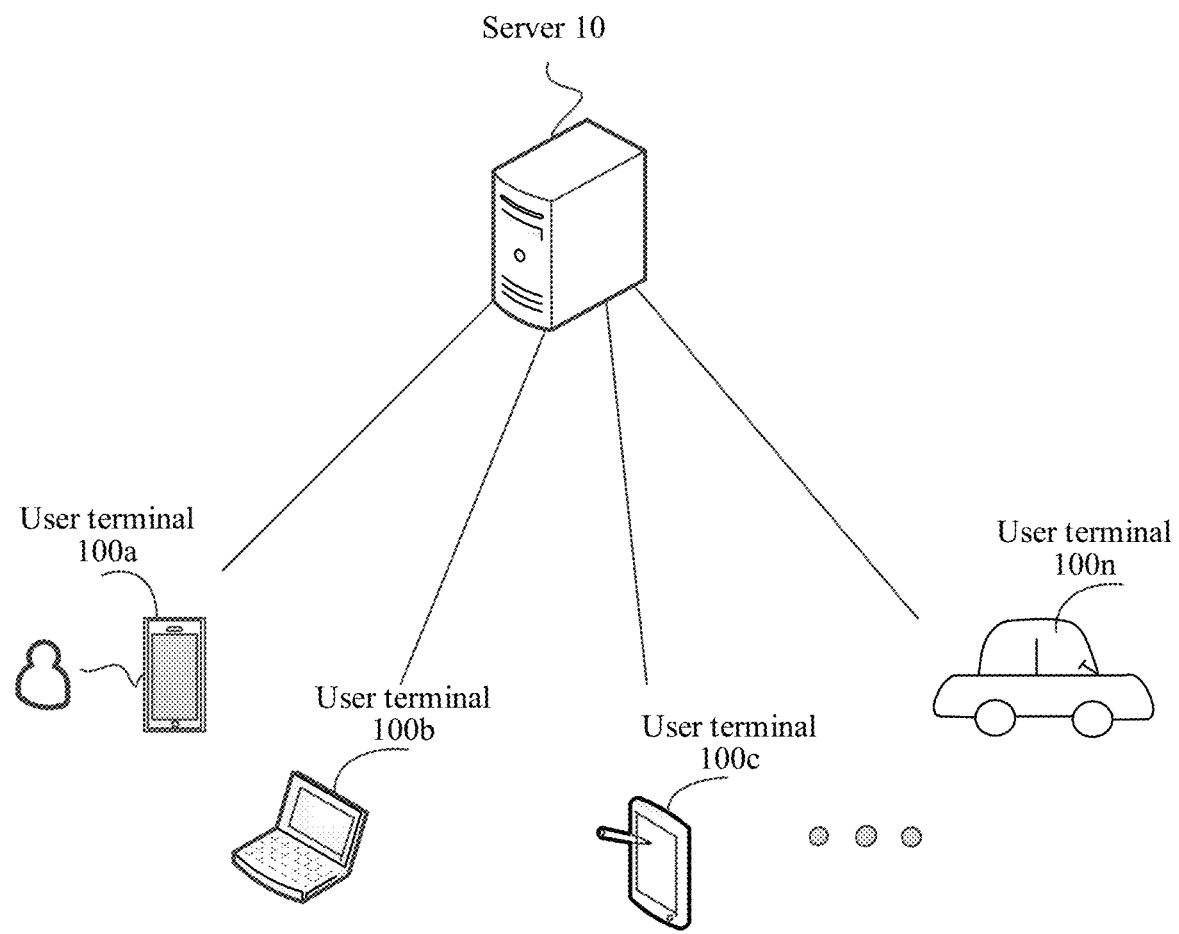
FIG. 1 is a schematic structural diagram of a network architecture provided by an embodiment of this disclosure.

The technical solutions in the embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person skilled in the art based on the embodiments of this disclosure without creative efforts shall fall within the protection scope of this disclosure.

A map data processing method provided by the embodiments of this disclosure may involve safe driving and other scenarios in the field of artificial intelligence, e.g., automatic driving, semi-automatic driving, safety assisted driving, vehicle navigation, and vehicle-road collaborative products. The so-called artificial intelligence (AI) refers to a new technical science that uses a digital computer or data computer controlled computer device (e.g., a server 10 shown in FIG. 1) to simulate, extend and expand the theory, method, technology and application system of human intelligence. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The artificial intelligence technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. AI software technologies mainly include directions such as a computer vision (CV) technology, a speech processing technology, a natural language processing (NLP) technology, and machine learning (ML)/deep learning (DL).

Computer vision in the computer vision (CV) technology is a science that studies how to use a machine to "see", and furthermore, is machine vision in which a camera and a computer are used for replacing human eyes to perform recognition, tracking, and measurement, and the like on a target, and further perform graphics processing, so that the computer processes the target into an image more suitable for human eyes to observe or an image transmitted to an instrument for detection. As a scientific subject, the CV studies related theories and technologies and attempts to establish an artificial intelligence (AI) system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Please refer to FIG. 1, which is a schematic structural diagram of a network architecture provided by an embodiment of this disclosure. As shown in FIG. 1, the network architecture may include a server 10 and a user terminal cluster. The user terminal cluster may include one or more user terminals, and the number of the user terminals is not limited herein. As shown in FIG. 1, the user terminal cluster may specifically include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may be respectively connected to the server 10 through a network, so that each user terminal may perform data interaction with the server 10 by the network connection. The network connection is not limited in the connection mode, and may be directly or indirectly connected by wired communication, or directly or indirectly connected by wireless communication, or other methods, which is not limited in this disclosure.

The user terminals in the user terminal cluster may include: smart phones, tablet computers, notebook computers, wearable devices, smart home devices, head-mounted devices, vehicles, and other smart terminals with a map data processing function. Each user terminal in the user terminal cluster as shown in FIG. 1 may be installed with a target application (i.e., a map client application), and when the map client application runs in each user terminal, the user terminal may perform data interaction with the server 10 shown in FIG. 1. The map client application may be configured to navigate a navigation user. The map client application may be an independent client, or an embedded subclient integrated in a client (e.g., a social client, and a shopping client), which is not limited herein.

As shown in FIG. 1, the server 10 in the embodiments of this disclosure may be a server corresponding to the map client application. The server 10 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

For ease of understanding, in the embodiments of this disclosure, one user terminal may be selected from the plurality of user terminals shown in FIG. 1 as a target user terminal. For example, in the embodiments of this disclosure, the user terminal 100a shown in FIG. 1 may be used as the target user terminal, and the map client application terminal may be integrated in the target user terminal. The user corresponding to the target user terminal may be referred to as a navigation user in the embodiments of this disclosure. Thus, the target user terminal may implement data interaction with the server 10 through a service data platform corresponding to the map client application.

The navigation interface of the map client application in the embodiments of this disclosure may display navigation route information associated with the navigation user. The navigation route information may be superimposed and displayed on map layer information that displays map data.

The map layer information may include map field information. The map field information may include a base map tilt, a field display range and a mobile mode. The base map tilt may be an angle between the terminal interface where the map client application is and the map plane corresponding to the map layer information. The base map tilt may be less than 90°, and the larger the base map tilt is, the more map data associated with the navigation route information is displayed in the navigation interface. The field display range may refer to the display range associated with the navigation route information displayed in the navigation interface. In the embodiments of this disclosure, the field display range may be adjusted adaptively to reasonably display the map data associated with the navigation route information concerned by the navigation user. The mobile mode refers to the movement mode of the map layer information and a vehicle icon corresponding to the navigation user in the navigation interface. In the embodiments of this disclosure, the mobile mode may be adjusted by a mobile strategy associated with the map client application, so that the navigation user may easily understand his/her real-time location at a navigation intersection, thereby enhancing the navigation user's experience at a location.

The map layer information may also include map elements. The map elements may include first elements and second elements. The first elements may include navigation roads associated with the navigation route information, and the second elements may include auxiliary information (e.g., buildings, parks, constructions and secondary roads) associated with the navigation route information. In the embodiments of this disclosure, the map display style corresponding to the map elements may be changed to highlight the intersection. For example, in the embodiments of this disclosure, the color of the base map of a common navigation scene may be changed to reduce the information interference caused by secondary information to the navigation user, including but not limited to, lightening the color of the base map of, or not displaying, secondary routes, constructions and the like around navigation intersections. In addition, in the embodiments of this disclosure, displaying of main information may also be enhanced by, including but not limited to, widening each lane of the navigation road associated with the navigation route information, highlighting the color of the base map of the navigation road, and displaying the boundaries between the lane of the current navigation road being travelled and parallel lanes in a highlighted color, thereby enhancing the boundaries between parallel lanes.

Figure 2:
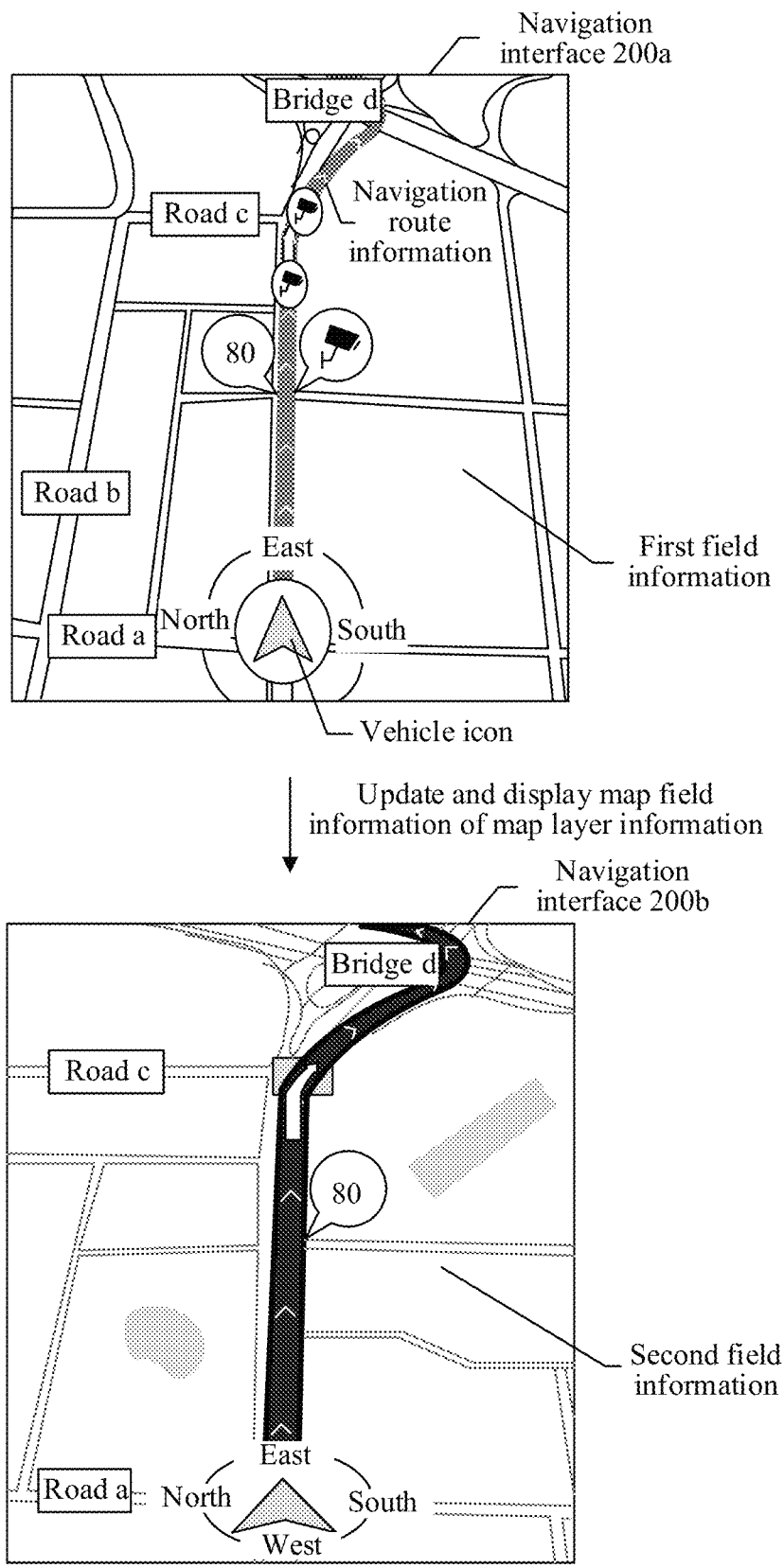
FIG. 2 is a schematic diagram of a data interaction scenario provided by an embodiment of this disclosure.

For ease of understanding, please refer to FIG. 2, which is a schematic diagram of a data interaction scenario provided by an embodiment of this disclosure. As shown in FIG. 2, the computer device in the embodiments of this disclosure may run a map client application for navigation. The computer device may be any user terminal in the user terminal cluster shown in FIG. 1, e.g., the user terminal 100a. The navigation interface 200a and the navigation interface 200b may both be navigation interfaces corresponding to the map client application.

In a navigation scenario, the computer device (e.g., the user terminal) corresponding to the navigation user may be a vehicle installed with a map client application, or a terminal device installed with a map client application, which is not limited herein. When the navigation user needs to drive from point A to point B, the navigation route information between point A and point B may be determined in the map client application, and the navigation route information is outputted to the navigation interface corresponding to the map client application (e.g., the navigation interface 200a shown in FIG. 2). The navigation interface 200a may display the map layer information, and the navigation route information may be superimposed and displayed on the map layer information. The map layer information may include map data associated with the navigation route information, for example, secondary roads corresponding to label information such as road a, road b, road c, and bridge d. In addition, the navigation interface 200a may also display icons (e.g., camera icons and speed limit icons) corresponding to map elements of interest associated with the navigation route information, and a vehicle icon corresponding to the navigation user. The vehicle icon may be a displayed icon in the navigation interface where the navigation user is.

The computer device may obtain the location information of the navigation user on the navigation route information in real time, so as to continuously monitor the predicted distance between the navigation user and a navigation intersection on the navigation route information, and calculate an intersection display enhancement condition when the navigation user is about to arrive at the navigation intersection in combination with other factors. The other factors may include, but not limited to, the driving speed of the navigation user on the navigation route information, weather, degree of congestion, accidents and other traffic information. The intersection display enhancement condition may include, but not limited to, the predicted time for the navigation user to arrive at the navigation intersection, for example, the intersection display enhancement condition may be directly determined based on the predicted distance between the navigation user and the navigation intersection, or may be determined based on the predicted time for the navigation user to arrive at the navigation intersection, which is not limited herein.

When the location information of the navigation user does not meet the intersection display enhancement condition, it means that the location information of the navigation user is outside the intersection area of the navigation intersection on the navigation route information, that is, the navigation user has not yet arrived at the navigation intersection. Exemplarily, when the location information of the navigation user meets the intersection display enhancement condition, it means that the location information of the navigation user is in the intersection area of the navigation intersection on the navigation route information, that is, the navigation user is about to arrive at the navigation intersection. When the location information of the navigation user is outside the intersection area on the navigation route information, in the embodiments of this disclosure, the map field information of the map layer information included in the navigation interface 200a may be referred to as the first field information.

When the location information is monitored to be in the intersection area, the computer device may update and display the map field information from the first field information to the second field information in the navigation display interface. The navigation interface corresponding to the updated map field information may be the navigation interface 200b shown in FIG. 2. The field display range corresponding to the second field information displayed in the navigation interface 200b is superior to the field display range corresponding to the first field information displayed in the navigation interface 200a.

Therefore, the computer device in the embodiments of this disclosure may obtain the location information of the navigation user on the navigation route information in real time in a navigation scenario, so as to monitor whether the location information is in the intersection area on the navigation route information. The location information being in the intersection area means that the navigation user is about to arrive at the intersection corresponding to the intersection area. At this time, the computer device needs to adjust the map field information of the map layer information in the navigation interface, so as to update the map field information from the first field information to the second field information. Since the field display range corresponding to the second field information is superior to the field display range corresponding to the first field information, when the navigation user is about to arrive at the intersection, the computer device may update and display the map field information to display more map data associated with the navigation route information, such that the navigation user may obtain the information of the road where he/she will pass later in advance, and the safety during navigation is improved.

Refer to the embodiments corresponding to FIG. 3 to FIG. 9 below for the detailed description of the computer device installed with the map client application updating and displaying the map field information in the navigation interface of the map client application from the first field information to the second field information when the location information of the navigation user is monitored to be in the intersection area on the navigation route information.

Figure 3:
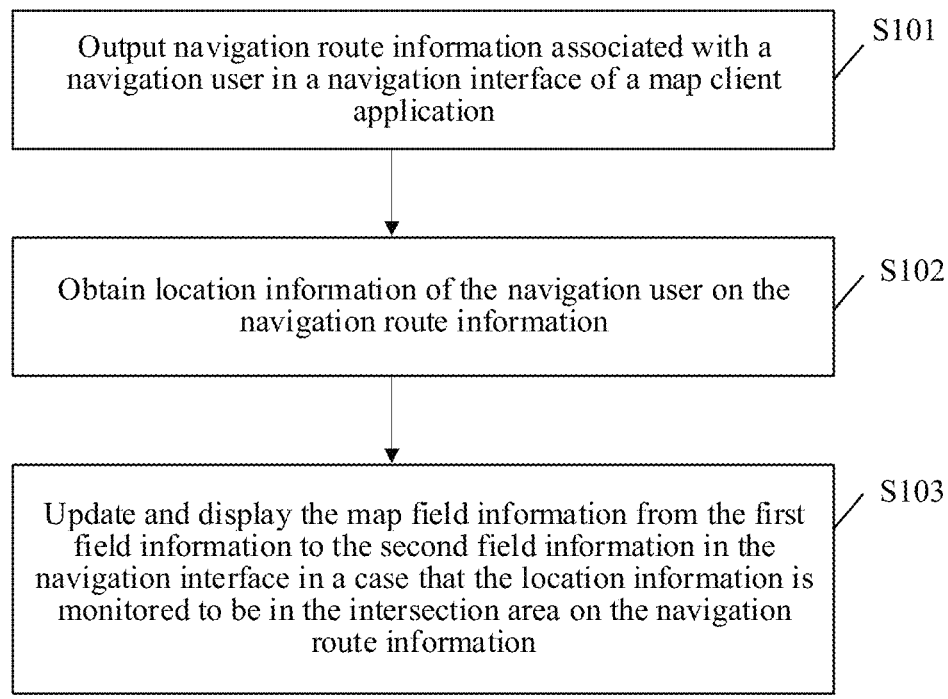
FIG. 3 is a schematic flowchart of a map data processing method provided by an embodiment of this disclosure.

Further, please refer to FIG. 3, which is a schematic flowchart of a map data processing method provided by an embodiment of this disclosure. As shown in FIG. 3, the method may be performed by a computer device (e.g., a user terminal) installed with a map client application, and the user terminal may be a vehicle installed with a map client application, or a terminal device installed with a map client application, which is not limited herein. The computer device may be any user terminal in the user terminal cluster shown in FIG. 1, e.g., the user terminal 100a. The method may include at least the following S101 to S103:

S101: Output navigation route information associated with a navigation user in a navigation interface of a map client application.

Specifically, the computer device may output initial area map data in a first display interface of the map client application in response to a first trigger operation on the map client application. The initial area map data is determined by initial geographic location information where the navigation user corresponding to the map client application is. The first display interface may include a location search area. Further, the computer device may obtain destination geographic location information entered in the location search area in response to a second trigger operation on the location search area, and further output the destination area map data associated with the destination geographic location information in a second display interface of the map client application. The second display interface may include a service control for instructing the navigation user to navigate. At this time, the computer device may determine the navigation route information based on the destination geographic location information and the initial geographic location information in response to a third trigger operation on the service control, and then output the navigation route information in the navigation interface of the map client application.

Figure 4:
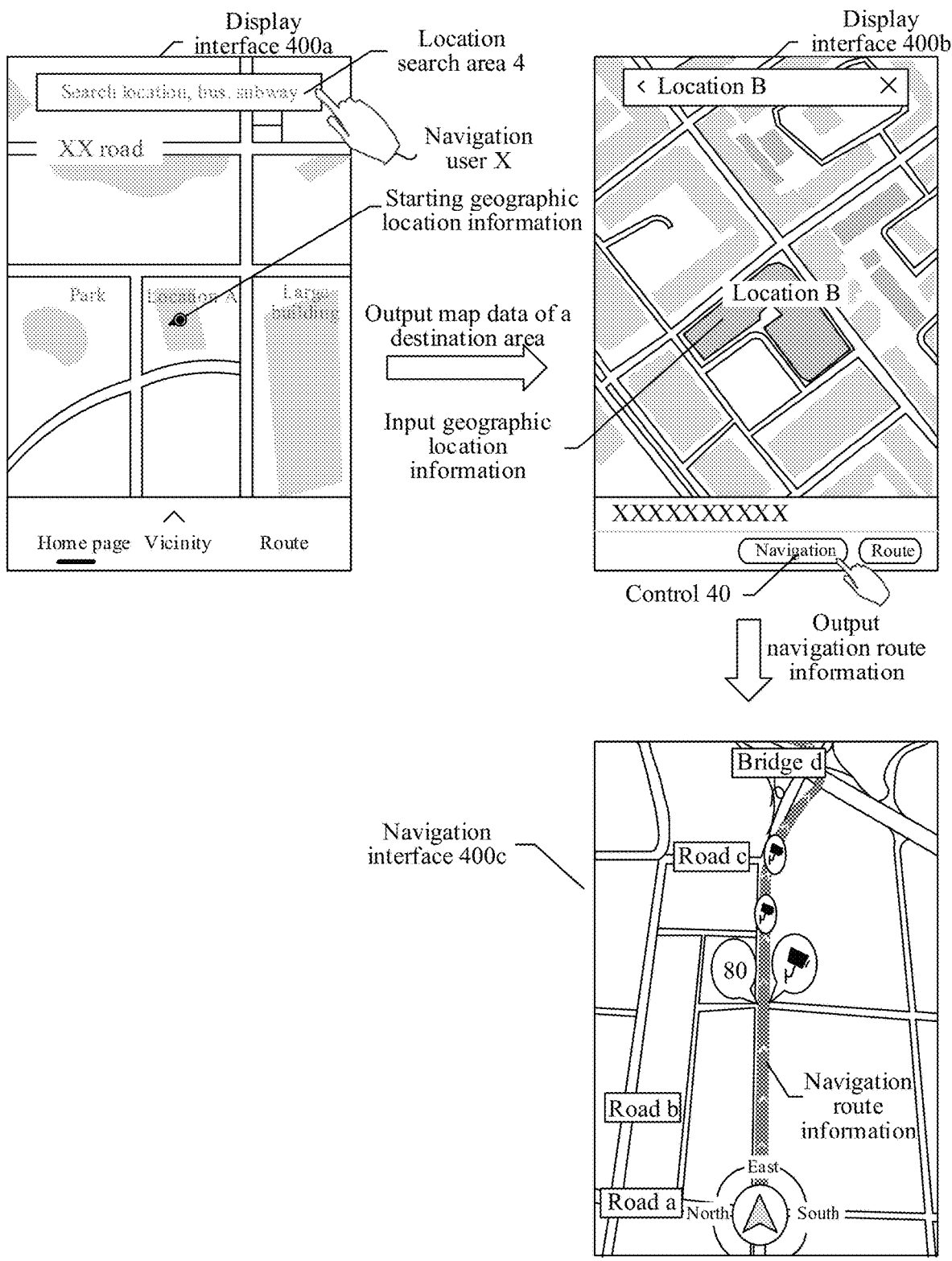
FIG. 4 is a schematic diagram of a scenario for outputting navigation route information provided by an embodiment of this disclosure.

For ease of understanding, please refer to FIG. 4, which is a schematic diagram of a scenario for outputting navigation route information provided by an embodiment of this disclosure. As shown in FIG. 4, the computer device in the embodiments of this disclosure may run a map client application for navigation. The computer device may be any user terminal in the user terminal cluster shown in FIG. 1, e.g., the user terminal 100a.

In a navigation scenario, the computer device (e.g., the user terminal) corresponding to the navigation user (e.g., the navigation user X shown in FIG. 4) may be a vehicle installed with a map client application, or a terminal device installed with a map client application, which is not limited herein. When the navigation user X goes to a certain place, he/she may perform a trigger operation (i.e., the first trigger operation) on the computer device on the map client application to start the map client application for navigation. The trigger operation may be contact operations such as clicking and long pressing, and may also be non-contact operations such as voice and gesture, which is not limited herein. At this time, the computer device may obtain the initial geographic location information (e.g., location A) in response to the first trigger operation, and then output an initial area map determined based on the initial geographic location information to the first display interface (e.g., the display interface 400a shown in FIG. 4) of the map client application. The display interface 400a may include a location search area (e.g., the location search area 4 shown in FIG. 4).

Further, the navigation user X may perform a second trigger operation (e.g., a click operation) on the location search area, to input the destination geographic location information (e.g., location B) in the location search area 4. The destination geographic location information may be directly entered by the navigation user X in the location search area 4, or may also be historical location information (that is, location information that has been searched before) selected by the navigation user X in the display interface to which the location search area 4 belongs. At this time, the computer device may obtain the destination geographic location information entered by the navigation user X in response to the second trigger operation, and then may obtain the destination area map data associated with the location B. The computer device may output the destination area map data in the second display interface (e.g., the display interface 400*b* shown in FIG. 4) of the map client application. The display interface 400*b* may further include a service control for instructing the navigation user to navigate, and the service control may be the control 4 shown in FIG. 4 (e.g., a "navigation" control).

At this time, the navigation user X may perform a third trigger operation (e.g., a click operation) on the control 4, and in response to the third trigger operation, the computer device may determine the navigation route information (that is, the navigation route information from location A to location B) associated with the navigation user X based on the destination geographic location information in the destination area map data and the initial geographic location information in the initial area map data, and further output the navigation route information in the navigation interface (e.g., the navigation interface 400*c* shown in FIG. 4) of the map client application.

S102: Obtain location information of the navigation user on the navigation route information.

Specifically, the computer device may obtain the location information of the navigation user on the navigation route information in real time to continuously monitor the predicted distance between the navigation user and a navigation intersection on the navigation route information, and further monitor whether the location information is in the intersection area on the navigation route information.

The computer device may obtain the intersection information of the navigation intersection on the navigation route information and the intersection display enhancement condition associated with the map client application. The intersection display enhancement condition may be used for indicating the navigation user whether he/she is about to arrive at the navigation intersection. The intersection display enhancement condition may include, but not limited to, the predicted time for the navigation user to arrive at the navigation intersection and the predicted distance. Further, the computer device may determine the predicted distance between the location information and the intersection information. When the predicted distance is less than or equal to a distance threshold in the intersection display enhancement condition, the computer device may determine that the location information of the navigation user is in the intersection area on the navigation route information. Exemplarily, when the predicted distance is greater than the distance threshold in the intersection display enhancement condition, the computer device may determine that the location information of the navigation user is outside the intersection area on the navigation route information.

For example, the distance threshold in the intersection display enhancement condition may be 500 m. Then, when the predicted distance between the location information and the intersection information determined by the computer device is 620 m, the computer device may determine that the location information of the navigation user is outside the intersection area, that is, the navigation user has not yet arrived at the navigation intersection. Exemplarily, when the predicted distance between the location information and the intersection information determined by the computer device is 450 m, the computer device may determine that the location information of the navigation user is in the intersection area, that is, the navigation user is about to arrive at the navigation intersection.

The computer device may also calculate the intersection display enhancement condition when the navigation user is about to arrive at the navigation intersection in combination with other factors (e.g., vehicle speed, weather, degree of congestion, accidents, and other traffic information). After the computer device determines the predicted distance between the location information and the intersection information, the computer device may also obtain the driving speed of the navigation user on the navigation route information, and obtain the traffic information between the location information and the intersection information. The traffic information may be issued by a server corresponding to the map client application (e.g., the server 10 shown in FIG. 1). Further, the computer device may determine the predicted time for the navigation user to arrive at the intersection information based on the predicted distance, the driving speed and the traffic information.

Specifically, the calculation formula for determining the predicted time for the navigation user to arrive at the intersection information by the computer device is as the following formula (1):

$$\text{predicted time=predicted distance/predicted speed} \quad (1)$$

The predicted speed may refer to the traveling speed of the navigation user calculated according to the driving speed and traffic information. The predicted distance may refer to the distance between the location information of the navigation user and the intersection information of the navigation intersection.

When the predicted time does not reach the time threshold in the intersection display enhancement condition, the computer device may determine that the location information is outside the intersection area on the navigation route information. Exemplarily, when the predicted time reaches the time threshold in the intersection display enhancement condition, the computer device may determine that the location information is in the intersection area on the navigation route information.

For example, the time threshold in the intersection display enhancement condition may be 5 sec. Then, when the predicted time for the navigation user to arrive at the intersection information of the navigation intersection determined by the computer device is 10 sec, the computer device may determine that the location information of the navigation user is outside the intersection area, that is, the navigation user has not yet arrived at the navigation intersection. Exemplarily, when the predicted time for the navigation user to arrive at the intersection information of the navigation intersection determined by the computer device is 4 sec, the computer device may determine that the location information of the navigation user is in the intersection area, that is, the navigation user is about to arrive at the navigation intersection.

S103: Update and display the map field information from the first field information to the second field information in the navigation interface when the location information is monitored to be in the intersection area on the navigation route information.

The second field information displays more map data associated with the navigation route information than the first field information, and the map data of the second field information includes the road information after the intersection area is passed through on the navigation route information.

Specifically, when the location information is monitored to be in the intersection area on the navigation route information, the computer device may call a base map interface associated with the map client application. In the navigation interface of the map client application, the computer device may adjust the base map tilt angle included in the map field information from a first angle in the first field information to a second angle by the base map interface. Both the first angle and the second angle are less than 90°, and the first angle is less than the second angle. Further, the computer device may update and display the second field information associated with the second angle in the navigation interface.

The base map tilt may be an angle between the terminal interface where the map client application is and the map plane corresponding to the map layer information. Adjusting the base map tilt may change the map data associated with the navigation route information displayed in the navigation interface. The larger the base map tilt is, the more map data associated with the navigation route information is displayed.

For example, the base map tilt in the navigation interface 200a shown in FIG. 2 may be the first angle (e.g., 10°) in the first field information. In other words, if the angle between the line of sight of the navigation user and the terminal interface where the map client application is may be regarded as 90°, then the angle between the line of sight of the navigation user and the map plane corresponding to the map layer information in the navigation interface 200a may be 100°. when the location information is monitored to be in the intersection area on the navigation route information, the computer device may call a base map interface associated with the map client application. In the navigation interface 200a of the map client application, the computer device may adjust the base map tilt angle from 10° to 30° (i.e., the second angle) by the base map interface. The computer device may update and display the second field information associated with the second angle in the navigation interface 200b shown in FIG. 2. The angle between the line of sight of the navigation user and the map plane corresponding to the map layer information in the navigation interface 200b may be 120°.

Further, to reasonably display the map data associated with the navigation route information, the computer device may adjust the field display range in the map field information after adjusting the base map tilt. The computer device may determine the intersection information of the navigation intersection in the intersection area based on the navigation route information, and may display an intersection display icon corresponding to the navigation intersection and a vehicle icon corresponding to the navigation user in the navigation interface. The intersection display icon refers to a display icon of the intersection information in the navigation interface. The vehicle icon refers to the display icon of the location where the navigation user is in the navigation interface.

At this time, the computer device may determine the road type between the location information and the intersection information based on the vehicle icon and the intersection display icon. Based on the vehicle icon and the intersection display icon, the computer device may obtain an outbound point when the navigation user arrives at the navigation intersection, and obtain the navigation direction indicated by the navigation route information associated with the outbound point. When the outbound point belongs to a first boundary of the intersection display icon, and the angle between the navigation direction and the first boundary belongs to a first angle range corresponding to the first boundary, then the computer device may determine the road type between the location information and the intersection information as a first road section type. For example, the first angle range may be 0° to 180°, and then the computer device may determine the first road section type as a straight-line-like section type. Exemplarily, when the outbound point belongs to a second boundary of the intersection display icon, and the angle between the navigation direction and the second boundary belongs to a second angle range corresponding to the second boundary, then the computer device may determine the road type between the location information and the intersection information as a second road section type. For example, the second angle range may be 180° to 360°, then the computer device may determine that the second road section type is a U-turn section type. Exemplarily, when the outbound point belongs to a third boundary of the intersection display icon, and the angle between the navigation direction and the third boundary is 180°, then the computer device may determine the road type between the location information and the intersection information as a third road section type (e.g., a left-turn section type). Exemplarily, when the outbound point belongs to a fourth boundary of the intersection display icon, and the angle between the navigation direction and the fourth boundary is 360°, then the computer device may determine the road type between the location information and the intersection information as a fourth road section type (e.g., a right-turn section type). The computer device may determine the road type between the location information and the intersection information based on the first road section type, the second road section type, the third road section type or the fourth road section type.

Further, the computer device may adjust the field display range from the first display range in the first field information to the second display range on the navigation route information based on the road type. The map elements in the second display range may include all or part of the map elements in the first display range. When the road type is the first road section type, then the computer device may determine map elements of interest (e.g., curves, subsequent navigation route directions and various signs) associated with the navigation intersection from the navigation route information, and use the icons corresponding to the map elements of interest as the display icons of interest (e.g., speed limit icons, camera icons, traffic light icons, and the intersection display icon of the next navigation intersection). At this time, the computer device may determine the map data including the vehicle icon, the intersection display icon and the display icons of interest as the first data to be processed. Further, the computer device may obtain the first scale value of the scale corresponding to the first display range in the first field information, and adjust the scale parameter of the scale from a first scale value to a second scale value. The first scale value is greater than the second scale value. The computer device may adjust the first display range in the first field information to the second display range based on the scale corresponding to the second scale value, and the second display range is used for completely displaying the first data to be processed.

Figure 5:
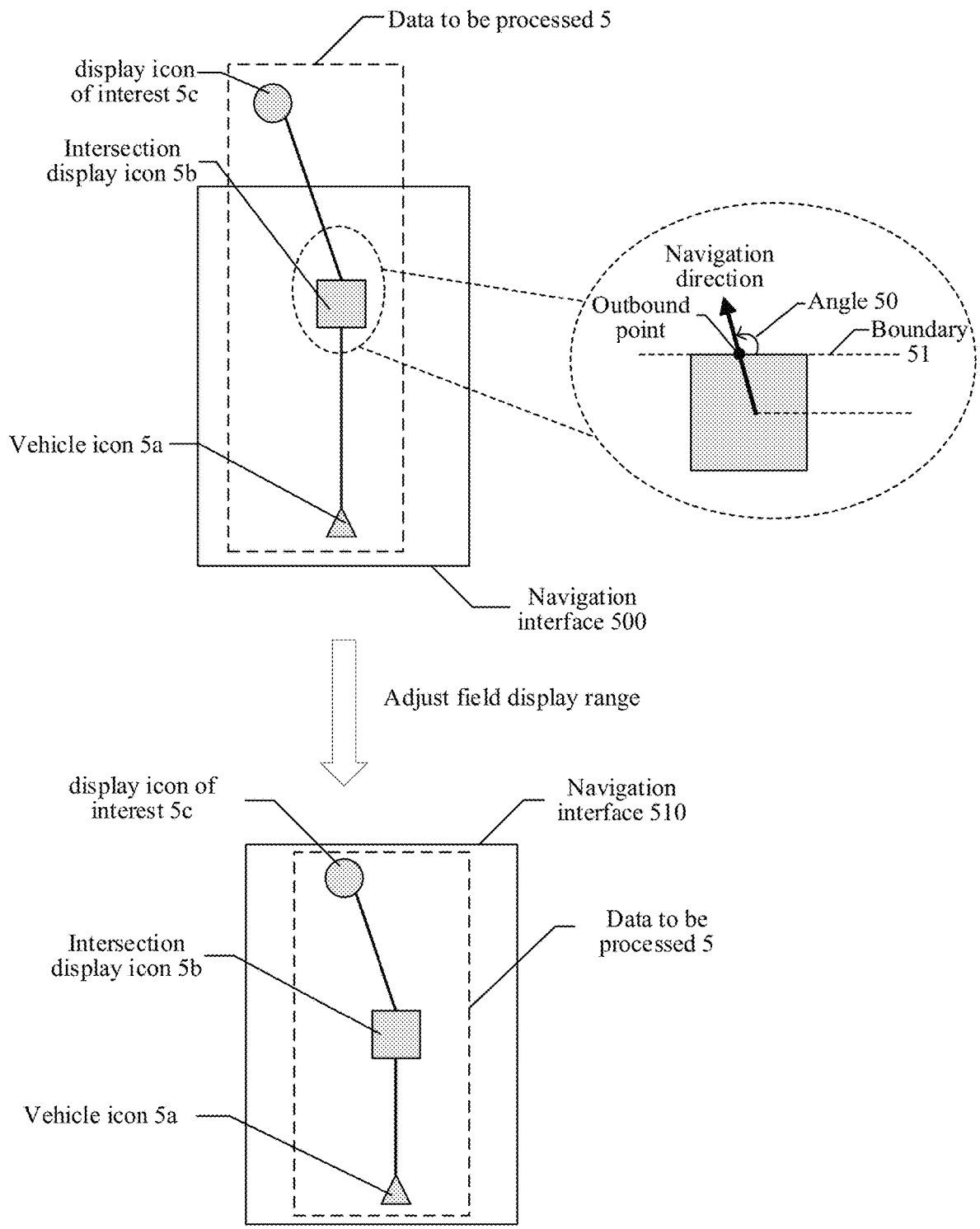
FIG. 5 is a schematic diagram of a scenario for adjusting the field display range based on a first road section type provided by an embodiment of this disclosure.

For ease of understanding, please refer to FIG. 5, which is a schematic diagram of a scenario for adjusting the field display range based on a first road section type provided by an embodiment of this disclosure. As shown in FIG. 5, the computer device in the embodiments of this disclosure may run a map client application for navigation. The computer device may be any user terminal in the user terminal cluster shown in FIG. 1, e.g., the user terminal 100a.

The map field information in the map layer information in the navigation interface 500 may be the first field information. In the navigation interface 500, after adjusting the base map tilt in the map field information from the first angle in the first field information to the second angle, the computer device may adjust the map field range in the map field information from the first display range in the first field information to the second display range.

Based on the vehicle icon (e.g., the vehicle icon 5a shown in FIG. 5) corresponding to the navigation user and the intersection display icon (e.g., the intersection display icon 5b shown in FIG. 5) corresponding to the navigation intersection, the computer device may obtain the outbound point when the navigation user arrives at the navigation intersection, and obtain the navigation direction indicated by the navigation route information associated with the outbound point. In the navigation interface 500, the outbound point obtained by the computer device belongs to the first boundary (e.g., the boundary 51 of the intersection display icon 5b) of the intersection display icon. The first angle range corresponding to the boundary 51 may be 0° to 180°.

For example, the angle between the navigation direction and the boundary 51 (e.g., the angle 50 shown in FIG. 5) is 120°, and then the computer device may determine that the angle 50 belongs to the first angle range corresponding to the boundary 51. At this time, the computer device may determine the road type between the location information and the intersection information as the first road section type (e.g., a straight-line-like section type).

Further, the computer device may determine the map elements of interest (e.g., curves, subsequent navigation route directions and various signs) associated with the navigation intersection from the navigation route information in the navigation interface 500, and use the icons corresponding to the map elements of interest as the display icons of interest (e.g., the display icon of interest 5c shown in FIG. 5). The display icons of interest may be the icons corresponding to the map elements of interest after the navigation intersection is passed through (e.g., speed limit icons, camera icons, traffic light icons, and the intersection display icon of the next navigation intersection).

At this time, the computer device may determine the map data including the vehicle icon 5a, the intersection display icon 5b and the display icon of interest 5c as the first data to be processed (e.g., the data to be processed 5 in the navigation interface 500). Further, the computer device may obtain the first scale value of the scale corresponding to the first display range in the navigation interface 500. The first scale value may be 1 cm: 20 m. At this time, to completely display the data to be processed 5 in the navigation interface of the map client application, the computer device may adjust the scale parameter of the scale from the first scale value to a second scale value (e.g., 1 cm: 50 m). The computer device may adjust the first display range in the first field information to the second display range (the field display range corresponding to the navigation interface 510 shown in FIG. 5) based on the scale corresponding to the second scale value. The second display range corresponding to the navigation interface 510 may be used for completely displaying the data to be processed 5.

Exemplarily, when the road type is a second road section type, the computer device may determine the map data including the vehicle icon and the intersection display icon as the second data to be processed. When the second data to be processed is recognized to be not in the central area of the navigation interface, the computer device may adjust the orientation (e.g., to the left, right, up, or down) of the first display range in the first field information, and use the field display range after orientation adjustment as the second display range. The second display range may be used for displaying the second data to be processed in the center.

Figure 6:
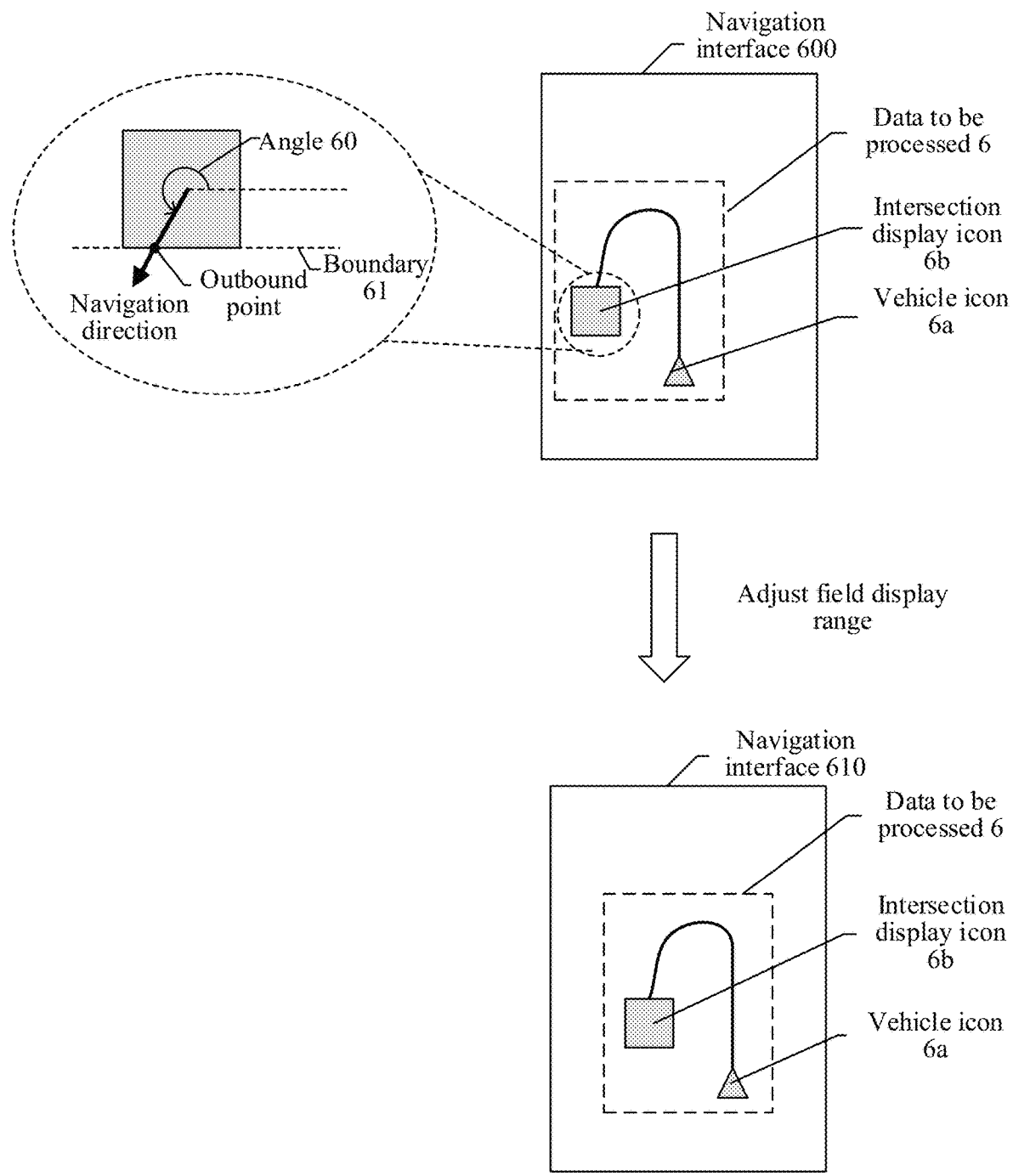
FIG. 6 is a schematic diagram of a scenario for adjusting the field display range based on a second road section type provided by an embodiment of this disclosure.

Please refer to FIG. 6, which is a schematic diagram of a scenario for adjusting the field display range based on a second road section type provided by an embodiment of this disclosure. As shown in FIG. 6, the computer device in the embodiments of this disclosure may run a map client application for navigation. The computer device may be any user terminal in the user terminal cluster shown in FIG. 1, e.g., the user terminal 100a.

The map field information in the map layer information in the navigation interface 600 may be the first field information. In the navigation interface 600, after adjusting the base map tilt in the map field information from the first angle in the first field information to the second angle, the computer device may adjust the map field range in the map field information from the first display range in the first field information to the second display range.

Based on the vehicle icon (e.g., the vehicle icon 6a shown in FIG. 6) corresponding to the navigation user and the intersection display icon (e.g., the intersection display icon 6b shown in FIG. 6) corresponding to the navigation intersection, the computer device may obtain the outbound point when the navigation user arrives at the navigation intersection, and obtain the navigation direction indicated by the navigation route information associated with the outbound point. In the navigation interface 600, the outbound point obtained by the computer device belongs to the second boundary (e.g., the boundary 61 of the intersection display icon 6b) of the intersection display icon. The second angle range corresponding to the boundary 61 may be 180° to 360°.

For example, the angle between the navigation direction and the boundary 61 (e.g., the angle 60 shown in FIG. 6) is 210°, and then the computer device may determine that the angle 60 belongs to the second angle range corresponding to the boundary 61. At this time, the computer device may determine the road type between the location information and the intersection information as the second road section type (e.g., a U-turn section type).

Further, the computer device may determine the map data including the vehicle icon 6a and the intersection display icon 6b as the second data to be processed (e.g., the data to be processed 6 shown in FIG. 6). When the data to be processed 6 is recognized to be not in the central area of the navigation interface 600, the computer device may adjust the orientation of the first display range in the first field information (e.g., move to the right), and use the field display range after the orientation adjustment as the second display range (the field display range corresponding to the navigation interface 610 shown in FIG. 6). The second display range corresponding to the navigation interface 610 may be used for displaying the data to be processed 6 in the center.

When the computer device determines the road type between the location information of the navigation user and the intersection information of the navigation intersection as the first road section type (for example, a straight-line-like section type), the computer device may determine the map elements of interest the navigation user will pass by after passing through the navigation intersection from the navigation route information. When there are a large number of map elements of interest, the computer device may not only adjust the scale parameter corresponding to the first display range in the first field information in the navigation interface, but also adjust the orientation of the first display range, to ensure that the data to be processed is displayed to the maximum extent in the navigation interface, and the intersection display icon corresponding to the navigation intersection is reasonably outputted in the navigation interface, thereby effectively avoiding disconnection of a route associated with the navigation intersection, enabling the map client application to display more route information to the navigation user, and improving the user experience.

Figure 7:
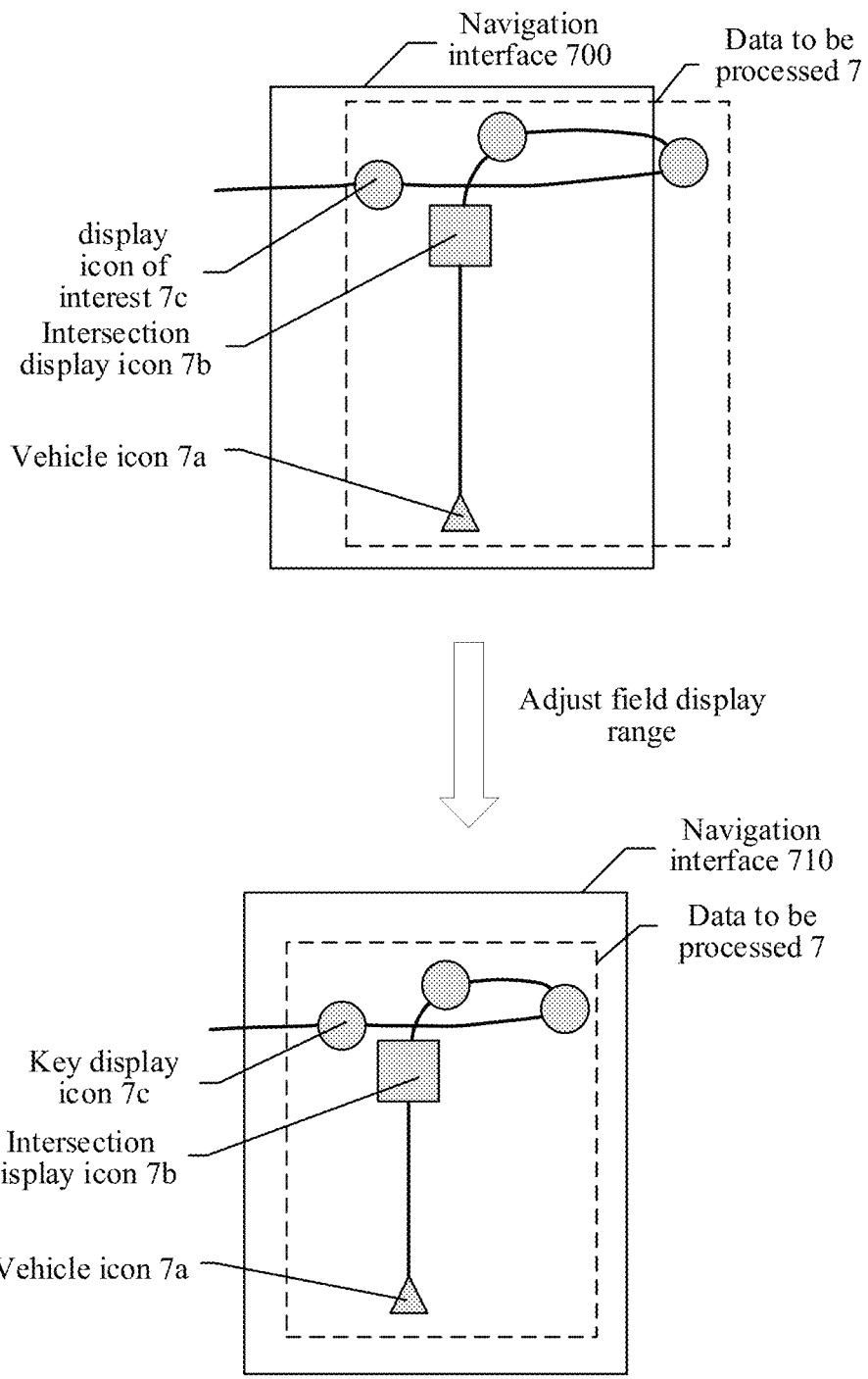
FIG. 7 is a schematic diagram of a scenario for adjusting a map field range provided by an embodiment of this disclosure.

Please refer to FIG. 7, which is a schematic diagram of a scenario for adjusting the map field range provided by an embodiment of this disclosure. As shown in FIG. 7, the computer device in the embodiments of this disclosure may run a map client application for navigation. The computer device may be any user terminal in the user terminal cluster shown in FIG. 1, e.g., the user terminal 100*a*.

The map field information in the map layer information in the navigation interface 700 may be the first field information. In the navigation interface 700, after adjusting the base map tilt in the map field information from the first angle in the first field information to the second angle, the computer device may adjust the map field range in the map field information from the first display range in the first field information to the second display range.

Based on the vehicle icon (e.g., the vehicle icon 7*a* shown in FIG. 7) corresponding to the navigation user and the intersection display icon (e.g., the intersection display icon 7*b* shown in FIG. 7) corresponding to the navigation intersection, the computer device may determine the road section type in the navigation interface 700 as the first road section type (e.g., a straight-line-like section type). Refer to detailed description of determination of the road type in the navigation interface 500 shown in FIG. 5 for detailed description of the computer device determining the road type in the navigation interface 700, which will not be repeated herein.

Further, the computer device may determine the map elements of interest associated with the navigation intersection in the navigation interface 700 shown in FIG. 7, and use the icons corresponding to the map elements of interest as the display icons of interest (e.g., the display icons of interest 7*c* shown in FIG. 7). Due to the large number of map elements of interest, the computer device needs to determine the map data including the vehicle icon 7*a*, the intersection display icon 7*b* and the display icons of interest 7*c* as the data to be processed (e.g., the data to be processed 7 in the navigation interface 700). Further, the computer device may obtain the first scale value of the scale corresponding to the first display range in the navigation interface 700, and adjust the scale parameter of the scale from the first scale value to the second scale value. At this time, the computer device may adjust the first display range in the first field information based on the scale corresponding to the second scale value, so that the adjusted first display range may completely display the data to be processed 7.

When the computer device recognizes that the data to be processed 7 in the adjusted first display range is not in the central area in the navigation interface, the computer device may adjust the orientation of the adjusted first display range again, so that the re-adjusted first display range may display the data to be processed 7 in the center. At this time, in the embodiments of this disclosure, the re-adjusted first display range may be determined as the second display range, and the second display range may be the field display range corresponding to the navigation interface 710 shown in FIG. 7.

Further, to enable the navigation user to more easily understand the location information where he/she is, the computer device may change the mobile mode in the map field information after adjusting the base map tilt and the field display range. In the navigation interface of the map client application, the computer device may use the mobile mode in the first field information as the first mode. The first mode may be used for instructing the map client application to update the map layer of the map layer information when the vehicle icon is fixed in the navigation interface. At this time, the computer device may call a base map interface to obtain a mobile strategy associated with the map client application, and then may change the mobile mode from the first mode to a second mode based on the mobile strategy. The second mode may be used for instructing the map client application to update the position of the vehicle icon when the map layer information is fixed in the navigation interface. At this time, the computer device may display the second field information (e.g., the second field information included in the navigation interface 200*b* shown in FIG. 2) associated with the second angle, the second display range and the second mode in the navigation interface.

Therefore, the computer device in the embodiments of this disclosure may obtain the location information of the navigation user on the navigation route information in real time in a navigation scenario, so as to monitor whether the location information is in the intersection area on the navigation route information. The location information being in the intersection area means that the navigation user is about to arrive at the navigation intersection corresponding to the intersection area. At this time, the computer device needs to adjust the base map tilt, the field display range and the mobile mode in the map field information of the map layer information in the navigation interface, so as to update the map field information from the first field information to the second field information. Since the field display range corresponding to the second field information is superior to the field display range corresponding to the first field information, when the navigation user is about to arrive at the intersection, the computer device may update and display the map field information to display more map data associated with the navigation route information, such that the navigation user may obtain the information of the road where he/she will pass later in advance, and the safety during navigation is improved.

Figure 8:
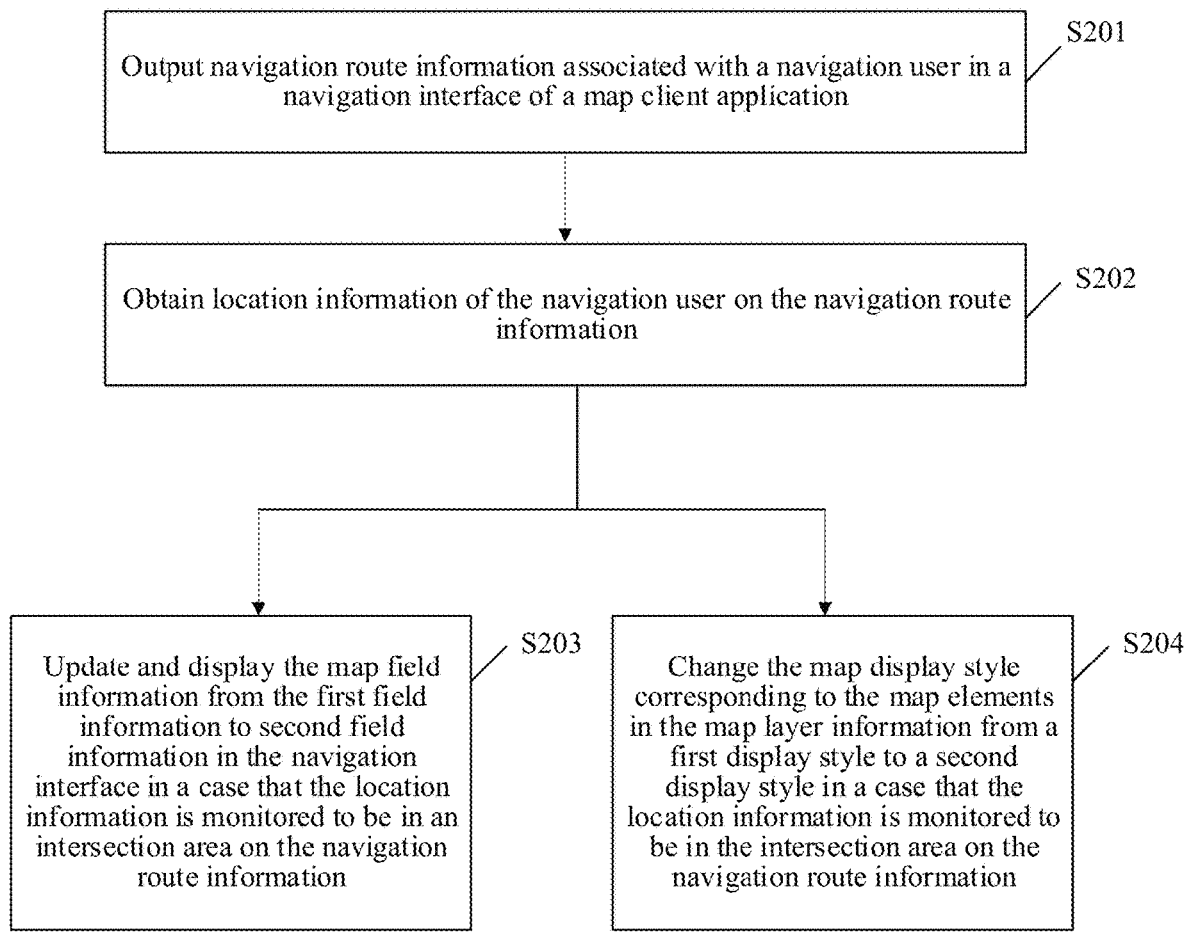
FIG. 8 is a schematic flowchart of a map data processing method provided by an embodiment of this disclosure.

Further, please refer to FIG. 8, which is a schematic flowchart of a map data processing method provided by an embodiment of this disclosure. As shown in FIG. 8, the method may be performed by a computer device (e.g., a user terminal) installed with a map client application, and the user terminal may be a vehicle installed with a map client application, or a terminal device installed with a map client application, which is not limited herein. The computer device may be any user terminal in the user terminal cluster shown in FIG. 1, e.g., the user terminal 100*a*. The method may include at least the following S201 to S204:

S201: Output navigation route information associated with a navigation user in a navigation interface of a map client application.

S202: Obtain location information of the navigation user on the navigation route information.

S203: Update and display the map field information from the first field information to the second field information in the navigation interface when the location information is monitored to be in the intersection area on the navigation route information.

Refer to the description of S101 to S103 in the embodiment corresponding to FIG. 3 for detailed description of S201 to S203, which will not be repeated herein.

S204: Change the map display style corresponding to the map elements in the map layer information from a first display style to a second display style when the location information is monitored to be in the intersection area.

Specifically, when the location information is monitored to be in the intersection area, the computer device installed with the map client application may call the base map interface associated with the map client application. The map elements of the map layer information included in the navigation interface may include first elements and second elements. Further, the computer device may enhance the first elements in the first display style through the base map interface, to obtain enhanced first elements. At the same time, the computer device may weaken the second elements in the first display style through the base map interface, to obtain weakened second elements. Further, the computer device may obtain the map elements in the changed map layer information based on the enhanced first elements and the weakened second elements, and use the map display style corresponding to the map elements in the changed map layer information as the second display style. The map elements in the second display style are obtained by performing element optimization on the map elements in the first display style.

The first elements (i.e. main information associated with the navigation route information) may include the navigation road associated with the navigation route information. In the process of enhancing the first elements, the computer device may enhance the road width and road brightness of the navigation road to highlight the main information. The computer device may change the road width corresponding to the navigation road from an initial width value in the first display style to a target width value through the base map interface. The target width value is determined based on the initial width value and a width enhancement coefficient associated with the map client application.

Specifically, the calculation formula for determining the target width value by the computer device is as the following formula (2):

$$\text{target width value}=\text{initial width value}*(1+\text{width enhancement coefficient}) \quad (2)$$

The initial width value refers to the original lane width, that is, the width value corresponding to the road width of the navigation road in the first field information. The width enhancement coefficient may be an enhancement percentage (e.g., 10%) associated with the map client application. The width enhancement coefficient may be dynamically adjusted according to actual needs, which is not limited herein.

For example, in the navigation interface 200a shown in FIG. 2, the initial width value of the navigation road is 30 mm, and when the computer device detects that the navigation user is about to arrive at the navigation intersection, the road width may be changed from 30 mm to 33 mm according to formula (2). For example, the road width of the navigation road in the navigation interface 200b shown in FIG. 2 may be 33 mm.

Further, the computer device may also change the road brightness corresponding to the navigation road from an initial brightness value in the first display style to a target brightness value associated with the map client application through the base map interface. Since the target brightness value is greater than the initial brightness value, the navigation road where the navigation user is passing may be highlighted in the navigation interface, and thus the boundary between the navigation road and the parallel lanes may be enhanced.

At this time, the computer device may use the navigation road with the target width value and the target brightness value as the enhanced first elements (e.g., the first elements in the navigation interface 200b shown in FIG. 2).

The second elements may include auxiliary information (e.g., secondary information) associated with the navigation route information, and the auxiliary information may be information of roads where the navigation user will not pass, including, but is not limited to, surrounding buildings, parks, secondary routes, constructions, etc. During weakening the second elements by the computer device, the transparency (alpha) value of the auxiliary information may be weakened to weaken and display the secondary information surrounding the navigation intersection. The lower the transparency value, the lighter the display effect in the navigation interface. The transparency value being 1 represents no transparency.

The computer device may obtain an initial transparency value corresponding to the auxiliary information in the first display style through the base map interface, and then may obtain a transparency determination rule associated with the map client application. The transparency determination rule may include a transparency reduction threshold. Specifically, the calculation formula of the transparency determination rule is as the following formula (3):

$$\text{target transparency value}=(1-\text{transparency reduction threshold})*\text{initial transparency value} \quad (3)$$

The transparency reduction threshold refers to an expected transparency percentage (e.g., 20%), and the transparency reduction threshold may be adjusted dynamically according to actual needs, which is not limited herein.

Further, the computer device may determine a target transparency value corresponding to the auxiliary information according to the formula (3), the initial transparency value and the transparency reduction threshold, and then use the auxiliary information with the target transparency value as the weakened second elements.

For example, in the navigation interface 200a shown in FIG. 2, the initial transparency value of the auxiliary information (e.g. secondary road) is 1 (i.e. no transparency), and when the computer device detects that the navigation user is about to arrive at the navigation intersection, the computer device may change the transparency value of the auxiliary information from 1 to 0.8 according to formula (3). For example, the transparency of the secondary road in the navigation interface 200b shown in FIG. 2 may be 0.8.

Of course, to change the transparency value corresponding to the second elements, the computer device may also directly decrease the initial transparency value (e.g., 1) to the transparency threshold (e.g., 0.5) associated with the map client application, and then may use the transparency threshold as the target transparency value (e.g., 0.5) corresponding to the second elements, to achieve a visual weakening effect. The transparency threshold may be adjusted dynamically according to actual conditions, which is not limited herein.

Further, when the computer device monitors that the location information is coincident with the intersection information corresponding to the intersection area, the computer device may output a navigation sub-interface. The location information being coincident with the intersection information means that the navigation user has already arrived at the navigation intersection. The navigation sub-interface may be superimposed and displayed on the navigation interface, and the display data on the navigation interface and the display data on the navigation sub-interface are independent of each other without interference. Exemplarily, the navigation sub-interface may also be a display interface different from the navigation interface, and when the navigation user arrives at the navigation intersection, the computer device may directly switch the display interface of the map client application from the navigation interface to the navigation sub-interface. The output mode of the navigation sub-interface is not limited here.

At this time, the computer device may output and display amplified map data associated with the intersection information in a manner of pictures, thumbnails or dialogue boxes in the navigation sub-interface. The amplified map data is obtained by amplifying the initial map data associated with the intersection information. The amplified map data may include multilane information of the navigation intersection, so as to instruct the navigation user to pass through the navigation intersection safely.

Further, when the computer device monitors that the location information is not coincident with the intersection information, the computer device may close the navigation sub-interface. The location information being not coincident with the intersection information means that the navigation user has already passed through the navigation intersection. At this time, the computer device may generate a display restoring instruction used for restoring the map field information, and then based on the display restoring instruction, restore the map field information from the second field information to the first field information in the navigation interface. Further, the computer device may also based on the display restoring instruction, restore the map display style corresponding to the map elements from the second display style to the first display style in the navigation interface.

Figure 9:
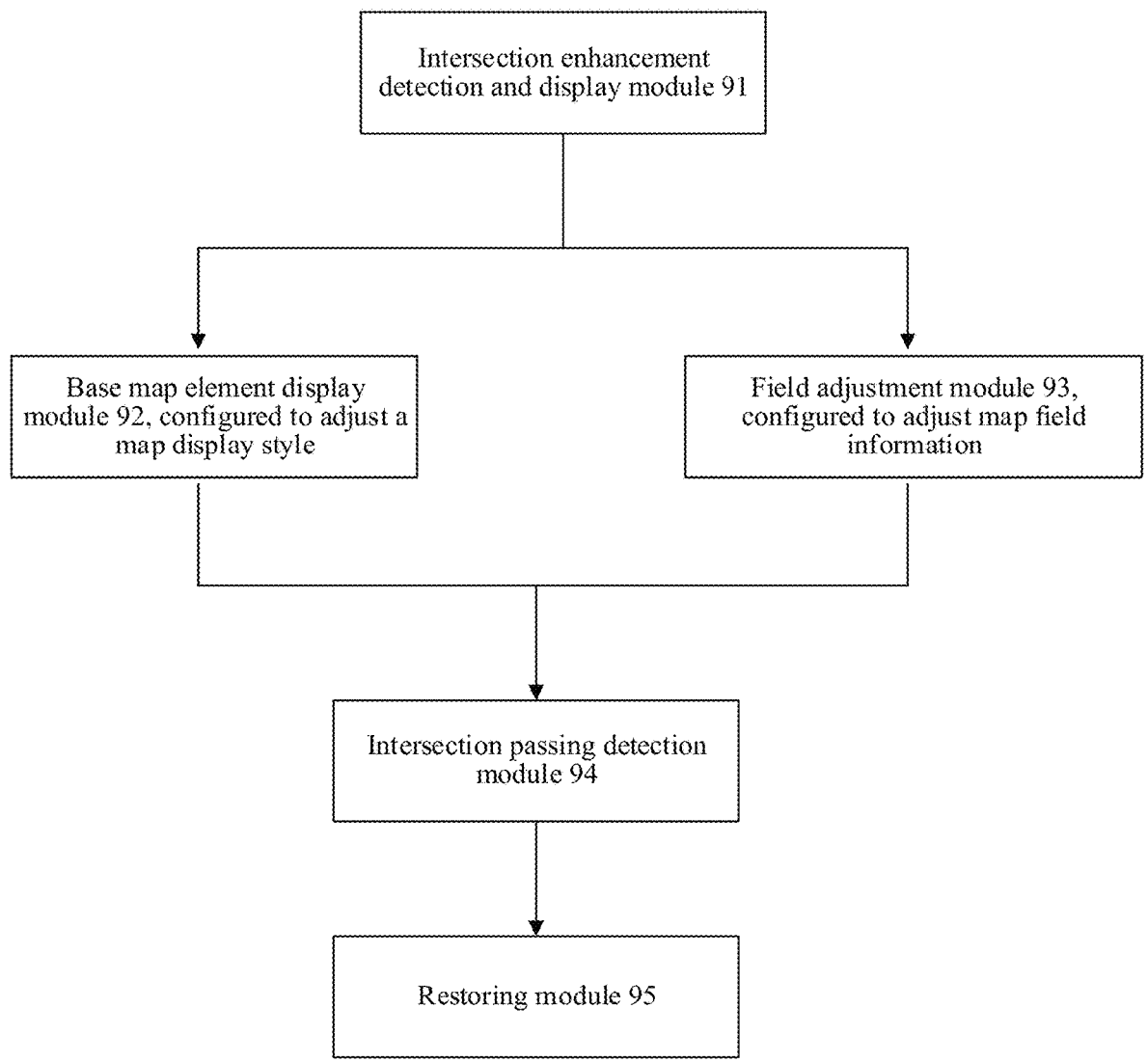
FIG. 9 is a system architecture diagram of map data processing provided by an embodiment of this disclosure.

Further, please refer to FIG. 9, which is a system architecture diagram of map data processing provided by an embodiment of this disclosure. As shown in FIG. 9, the system architecture diagram provided by the embodiments of this disclosure may include the following modules: an intersection enhancement detection and display module 91, a base map element display module 92, a field adjustment module 93, an intersection passing detection module 94 and a restoring module 95.

The computer device installed with the map client application may monitor whether the navigation user is about to arrive at the navigation intersection by the intersection enhancement detection and display module 91, that is, monitor whether the location information of the navigation user is in the intersection area on the navigation route information.

When the intersection enhancement detection and display module 91 monitors that the location information is in the intersection area, the computer device may trigger the field adjustment module 93 by the intersection enhancement detection and display module 91. By the field adjustment module 93, in the navigation interface of the map client application, the computer device may update and display the map field information from the first field information to the second field information, such that the map client application may display more map data associated with the navigation route information, and thus the navigation user may obtain the information of the road where he/she will pass later in advance.

At the same time, when the intersection enhancement detection and display module 91 monitors that the location information is in the intersection area, the computer device may trigger the base map element display module 92 by the intersection enhancement detection and display module 91. By the base map element display module 92, in the navigation interface of the map client application, the computer device may change the map display style corresponding to the map elements from the first display style to the second display style, such that the map client application may highlight map data associated with the navigation route information to reduce information interference caused by the secondary information to the navigation user, e.g., weakening constructions around the intersection, deepening the display color of the navigation road, widening each lane of the navigation road, and enhancing the boundaries between the lanes.

Further, the computer device may monitor whether the location information is coincident with the intersection information by the intersection passing detection module 94. When the computer device monitors that the location information is not coincident with the intersection information, the computer device may determine that the navigation user has already passed through the navigation intersection. At this time, the computer device may generate a display restoring instruction to notify the restoring module 95 to restore the map field information from the second field information to the first field information in the navigation interface, and restore the map display style of the map elements from the second display style to the first display style.

Therefore, the computer device in the embodiments of this disclosure may obtain the location information of the navigation user on the navigation route information in real time in a navigation scenario, so as to monitor whether the location information is in the intersection area on the navigation route information. The location information being in the intersection area means that the navigation user is about to arrive at the navigation intersection corresponding to the intersection area. The computer device needs to adjust the map field information of the map layer information in the navigation interface, so as to update the map field information from the first field information to the second field information. Since the field display range corresponding to the second field information is superior to the field display range corresponding to the first field information, when the navigation user is about to arrive at the navigation intersection, the computer device may update and display the map field information to display more map data associated with the navigation route information, such that the navigation user may obtain the information of the road where he/she will pass later in advance, and the safety during navigation is improved. In addition, the computer device may change the map display style corresponding to the map elements in the navigation interface to change the map display style from the first display style to the second display style. Since the map elements in the second display style are obtained by performing element optimization on the map elements in the first display style, when the navigation user is about to arrive at the navigation intersection, the computer device may highlight the main information concerned by the navigation user by changing the map display style, to reduce information interference caused by the secondary information to the navigation user.

Figure 10:
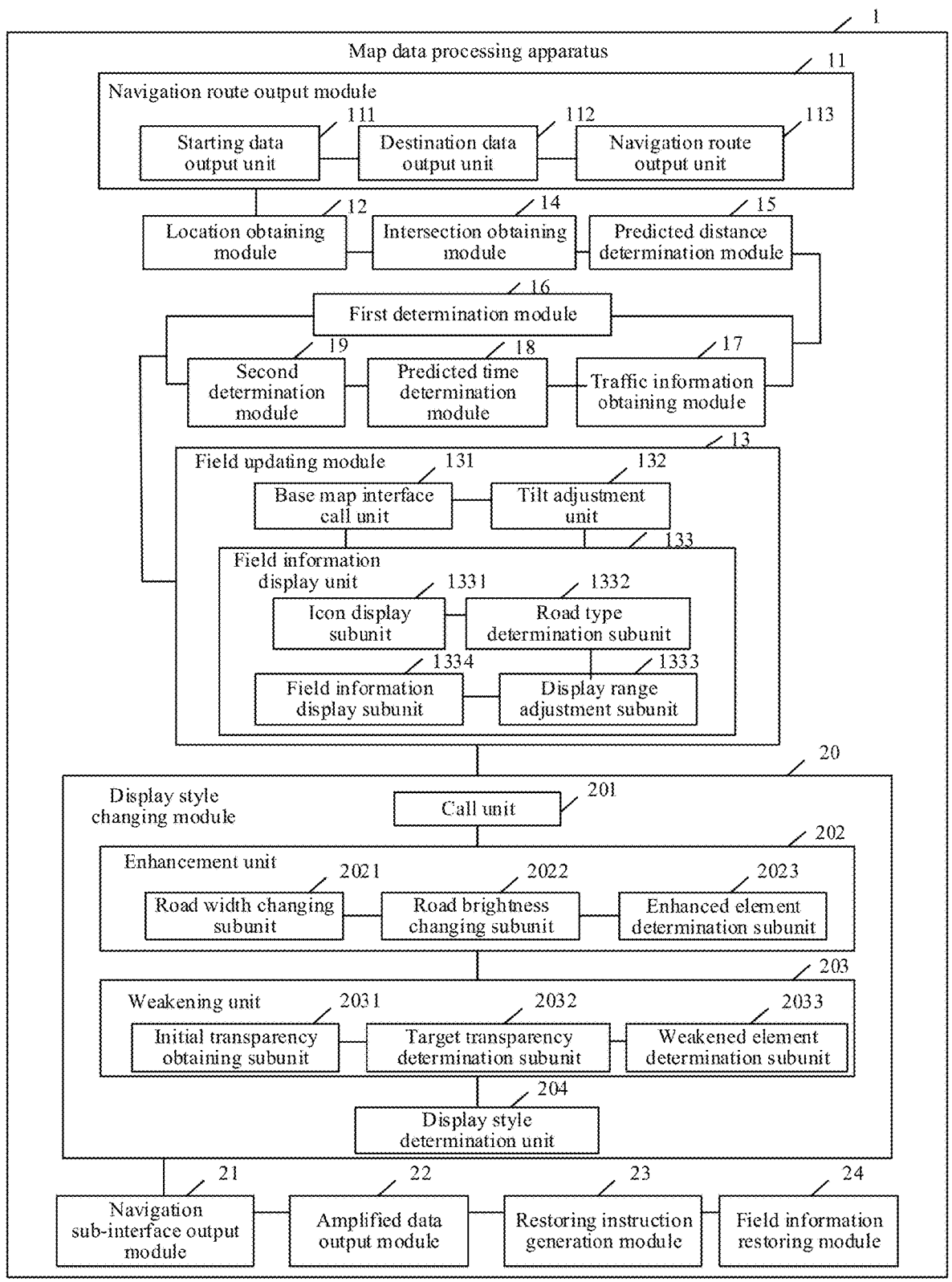
FIG. 10 is a schematic structural diagram of a map data processing apparatus provided by an embodiment of this disclosure.

Further, please refer to FIG. 10, which is a schematic structural diagram of a map data processing apparatus provided by an embodiment of this disclosure. As shown in FIG. 10, the map data processing apparatus 1 may be a computer program (including program codes) run in a computer device, for example, the map data processing apparatus 1 is application software. The map data processing apparatus 1 may be configured to perform the corresponding steps in the method provided by the embodiments of this disclosure. As shown in FIG. 10, the map data processing apparatus 1 may run in a computer device installed with a map client application, and the computer device may be any user terminal, e.g., the user terminal 100*a*, in the user terminal cluster in the embodiment corresponding FIG. 1.

The map data processing apparatus 1 may include a navigation route output module 11, a location obtaining module 12, a field updating module 13, an intersection obtaining module 14, a predicted distance determination module 15, a first determination module 16, a traffic information obtaining module 17, a predicted time determination module 18, a second determination module 19, a display style changing module 20, a navigation sub-interface output module 21, an amplified data output module 22, a restoring instruction generation module 23 and a field information restoring module 24.

The navigation route output module 11 is configured to output navigation route information associated with a navigation user in a navigation interface of a map client application, the navigation interface including map layer information, the navigation route information being superimposed and displayed on the map layer information, and map field information of the map layer information being first field information.

The navigation route output module 11 includes an initial data output unit 111, a destination data output unit 112 and a navigation route output unit 113.

The initial data output unit 111 is configured to output initial area map data in a first display interface of the map client application in response to a first trigger operation on the map client application, the initial area map data being determined by initial geographic location information where the navigation user is, and the first display interface including a location search area.

The destination data output unit 112 is configured to obtain the destination geographic location information entered in the location search area in response to a second trigger operation on the location search area, and further output the destination area map data associated with the destination geographic location information in a second display interface of the map client application, the second display interface including a service control for instructing the navigation user to navigate.

The navigation route output unit 113 is configured to determine the navigation route information based on the destination geographic location information and the initial geographic location information in response to a third trigger operation on the service control, and then output the navigation route information in the navigation interface of the map client application.

Refer to description of S101 in the embodiment corresponding to FIG. 3 for detailed description of the initial data output unit 111, the destination data output unit 112 and the navigation route output unit 113, which will not be repeated herein.

The location obtaining module 12 is configured to obtain location information of the navigation user on the navigation route information.

The field updating module 13 is configured to update and display the map field information from the first field information to second field information in the navigation interface when the location information is monitored to be in an intersection area on the navigation route information, the second field information showing more map data associated with the navigation route information than the first field information, and the map data in the second field information including road information after the intersection area is passed through on the navigation route information.

The map field information includes a base map tilt, the base map tilt being an angle between the terminal interface where the map client application is and the map plane corresponding to the map layer information.

The field updating module 13 includes a base map interface call unit 131, a tilt adjustment unit 132 and a field information display unit 133.

The base map interface call unit 131 is configured to call a base map interface associated with the map client application when the location information is monitored to be in the intersection area on the navigation route information.

The tilt adjustment unit 132 is configured to in the navigation interface, adjust the base map tilt angle from a first angle in the first field information to a second angle by the base map interface, both the first angle and the second angle being less than 90°, and the first angle being less than the second angle.

The field information display unit 133 is configured to update and display second field information associated with the second angle in the navigation interface.

The map field information includes a field display range.

The field information display unit 133 includes an icon display subunit 1331, a road type determination subunit 1332, a display range adjustment subunit 1333 and a field information display subunit 1334.

The icon display subunit 1331 is configured to determine the intersection information of the navigation intersection in the intersection area based on the navigation route information, and display an intersection display icon corresponding to the navigation intersection and a vehicle icon corresponding to the navigation user in the navigation interface.

The road type determination subunit 1332 is configured to determine the road type between the location information and the intersection information based on the vehicle icon and the intersection display icon.

The road type determination subunit 1332 is further configured to:

based on the vehicle icon and the intersection display icon, obtain an outbound point when the navigation user arrives at the navigation intersection, and obtain the navigation direction indicated by the navigation route information associated with the outbound point;

when the outbound point belongs to a first boundary of the intersection display icon, and the angle between the navigation direction and the first boundary belongs to a first angle range corresponding to the first boundary, determine the road type between the location information and the intersection information as a first road section type;

when the outbound point belongs to a second boundary of the intersection display icon, and the angle between the navigation direction and the second boundary belongs to a second angle range corresponding to the second boundary, determine the road type between the location information and the intersection information as a second road section type; and determine the first road section type or the second road section type as the road type between the location information and the intersection information.

The display range adjustment subunit 1333 is configured to adjust the field display range from the first display range in the first field information to the second display range on the navigation route information based on the road type, the map elements in the second display range including the map elements in the first display range.

The display range adjustment subunit 1333 is further configured to:

when the road type is the first road section type, determine map elements of interest associated with the navigation intersection from the navigation route information, and use the icons corresponding to the map elements of interest as the display icons of interest;

determine the map data including the vehicle icon, the intersection display icon and the display icons of interest as the first data to be processed;

obtain the first scale value of the scale corresponding to the first display range in the first field information, and adjust the scale parameter of the scale from a first scale value to a second scale value, the first scale value being greater than the second scale value; and adjust the first display range in the first field information to the second display range based on the scale corresponding to the second scale value, the second display range being used for completely displaying the first data to be processed.

The display range adjustment subunit 1333 is further configured to:

when the road type is a second road section type, determine the map data including the vehicle icon and the intersection display icon as the second data to be processed; and when the second data to be processed is recognized to be not in the central area of the navigation interface, adjust the orientation of the first display range in the first field information, and use the field display range after orientation adjustment as the second display range, the second display range being used for displaying the second data to be processed in the center.

The field information display subunit 1334 is configured to display the second field information associated with the second angle and the second display range in the navigation interface.

The map field information includes a mobile mode.

The field information display subunit 1334 is further configured to:

use the mobile mode in the first field information as a first mode in the navigation interface, the first mode being used for instructing the map client application to update the map layer of the map layer information when the vehicle icon is fixed in the navigation interface;

call a base map interface to obtain a mobile strategy associated with the map client application, and change the mobile mode from the first mode to a second mode based on the mobile strategy, the second mode being used for instructing the map client application to update the position of the vehicle icon when the map layer information is fixed in the navigation interface; and display the second field information associated with the second angle, the second display range and the second mode in the navigation interface.

Refer to description of the second field information in the embodiment corresponding to FIG. 3 for detailed description of the icon display subunit 1331, the road type determination subunit 1332, the display range adjustment subunit 1333 and the field information display subunit 1334, which will not be repeated herein.

Refer to description of S103 in the embodiment corresponding to FIG. 3 for detailed description of the base map interface call unit 131, the tilt adjustment unit 132 and the field information display unit 133, which will not be repeated herein.

The intersection obtaining module 14 is configured to obtain the intersection information of the navigation intersection on the navigation route information and the intersection display enhancement condition associated with the map client application.

The predicted distance determination module 15 is configured to determine the predicted distance between the location information and the intersection information.

The first determination module 16 is configured to when the predicted distance is less than or equal to a distance threshold in the intersection display enhancement condition, determine that the location information is in the intersection area on the navigation route information.

The traffic information obtaining module 17 is configured to obtain the driving speed of the navigation user on the navigation route information, and obtain the traffic information between the location information and the intersection information, the traffic information being issued by a server corresponding to the map client application.

The predicted time determination module 18 is configured to determine the predicted time for the navigation user to arrive at the intersection information based on the predicted distance, the driving speed and the road condition information.

The second determination module 19 is configured to when the predicted time reaches the time threshold in the intersection display enhancement condition, determine that the location information is in the intersection area on the navigation route information.

The display style changing module 20 is configured to change the map display style corresponding to the map elements in the map layer information from a first display style to a second display style when the location information is monitored to be in the intersection area on the navigation route information, the map elements in the second display style being obtained by performing element optimization on the map elements in the first display style.

The map elements in the map layer information include first elements and second elements.

The display style changing module 20 includes a call unit 201, an enhancement unit 202, a weakening unit 203 and a display style determination unit 204.

The call unit 201 is configured to when the location information is monitored to be in the intersection area on the navigation route information, call the base map interface associated with the map client application.

The enhancement unit 202 is configured to enhance the first elements in the first display style through the base map interface, to obtain enhanced first elements.

The first elements include the navigation road associated with the navigation route information.

The enhancement unit 202 includes a road width changing subunit 2021, a road brightness changing subunit 2022 and an enhanced element determination subunit 2023.

The road width changing subunit 2021 is configured to change the road width corresponding to the navigation road from an initial width value in the first display style to a target width value through the base map interface, the target width value being determined based on the initial width value and a width enhancement coefficient associated with the map client application.

The road brightness changing subunit 2022 is configured to change the road brightness corresponding to the navigation road from an initial brightness value in the first display style to a target brightness value associated with the map client application through the base map interface.

The enhanced element determination subunit 2023 is configured to use the navigation road with the target width value and the target brightness value as the enhanced first elements.

Refer to description of enhancement of the first elements in the embodiment corresponding to FIG. 8 for detailed description of the road width changing subunit 2021, the road brightness changing subunit 2022 and the enhanced element determination subunit 2023, which will not be repeated herein.

The weakening unit 203 is configured to weaken the second elements in the first display style through the base map interface, to obtain weakened second elements.

The second elements include auxiliary information associated with the navigation route information.

The weakening unit 203 includes an initial transparency obtaining subunit 2031, a target transparency determination subunit 2032 and a weakened element determination subunit 2033.

The initial transparency obtaining subunit 2031 is configured to obtain an initial transparency value corresponding to the auxiliary information in the first display style through the base map interface, and obtain a transparency determination rule associated with the map client application, the transparency determination rule including a transparency reduction threshold.

The target transparency determination subunit 2032 is configured to determine a target transparency value corresponding to the auxiliary information according to the initial transparency value and the transparency reduction threshold.

The weakened element determination subunit 2033 is configured to use the auxiliary information with the target transparency value as the weakened second elements.

Refer to description of weakening of the second elements in the embodiment corresponding to FIG. 3 for detailed description of the initial transparency obtaining subunit 2031, the target transparency determination subunit 2032 and the weakened element determination subunit 2033, which will not be repeated herein.

The display style determination unit 204 is configured to obtain the map elements in the changed map layer information based on the enhanced first elements and the weakened second elements, and use the map display style corresponding to the map elements in the changed map layer information as the second display style.

Refer to description of S204 in the embodiment corresponding to FIG. 3 for detailed description of the call unit 201, the enhancement unit 202, the weakening unit 203 and the display style determination unit 204, which will not be repeated herein.

The navigation sub-interface output module 21 is configured to when the location information is monitored to be coincident with the intersection information corresponding to the intersection area, output a navigation sub-interface.

The amplified data output module 22 is configured to display amplified map data associated with the intersection information in the navigation sub-interface, the amplified map data being obtained by amplifying the initial map data associated with the intersection information.

The restoring instruction generation module 23 is configured to when the location information is monitored to be not coincident with the intersection information, close the navigation sub-interface, and generate a display restoring instruction used for restoring the map field information.

The field information restoring module 24 is configured to based on the display restoring instruction, restore the map field information from the second field information to the first field information in the navigation interface.

Refer to description of S201 to S204 in the embodiment corresponding to FIG. 8 for detailed description of the navigation route output module 11, the location obtaining module 12, the field updating module 13, the intersection obtaining module 14, the predicted distance determination module 15, the first determination module 16, the traffic information obtaining module 17, the predicted time determination module 18, the second determination module 19, the display style changing module 20, the navigation sub-interface output module 21, the amplified data output module 22, the restoring instruction generation module 23 and the field information restoring module 24, which will not be repeated herein. In addition, the description of beneficial effects of using the same method are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 11:
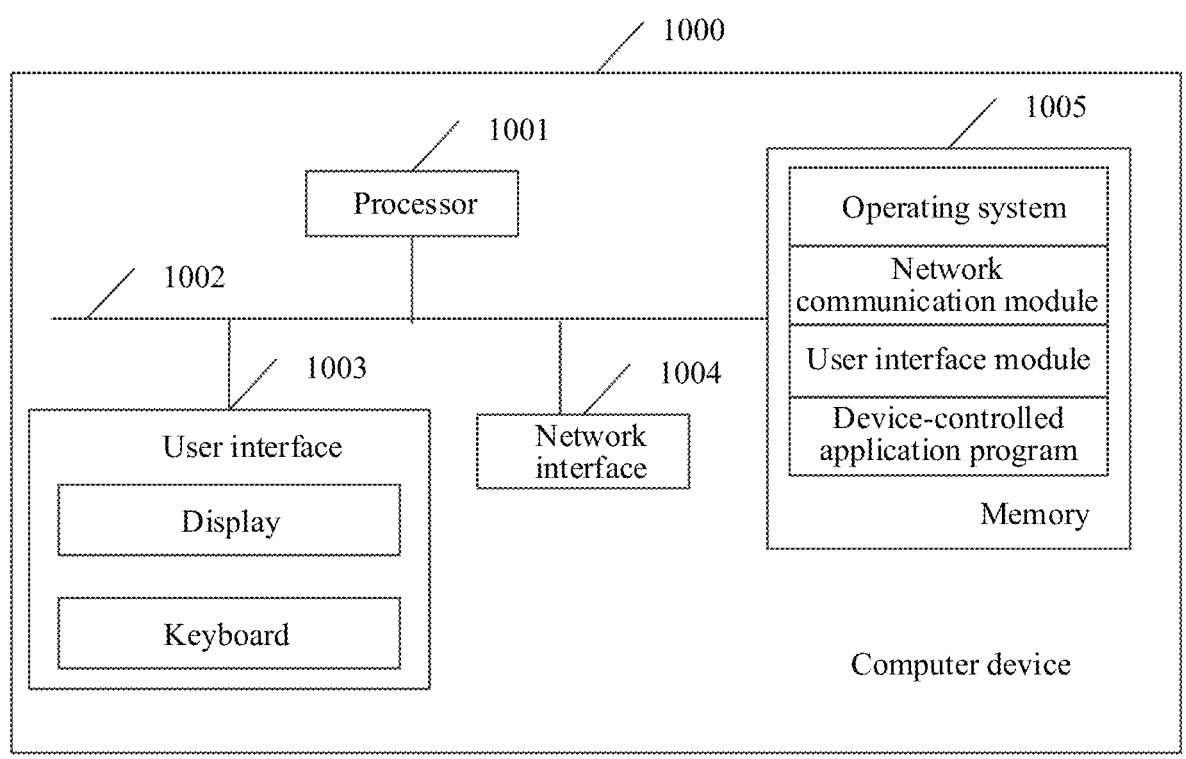
FIG. 11 is a schematic diagram of a computer device provided by an embodiment of this disclosure.

Further, please refer to FIG. 11, which is a schematic diagram of a computer device provided by an embodiment of this disclosure. As shown in FIG. 11, the computer device 1000 may be any user terminal in the user terminal cluster in the embodiment corresponding to FIG. 1, e.g., the user terminal 100a. The computer device 1000 may include at least one processor 1001, e.g. a CPU, at least one network interface 1004, a user interface 1003, a memory 1005, and at least one communication bus 1002. The communication bus 1002 is configured to implement connection and communication between these components. The user interface 1003 may include a display and a keyboard. The network interface 1004 may Exemplarily include a standard wired interface and a standard wireless interface (such as a WI-FI interface). The memory 1005 may be a high-speed RAM, or may be a non-volatile memory, for example, at least one magnetic disk memory. Exemplarily, the memory 1005 may be at least one storage apparatus located remotely from the foregoing processor 1001. As shown FIG. 11, the memory 1005 used as a computer storage medium may include an operating system, a network communication module, a user interface module, and a device-control application program.

In the computer device 1000 shown in FIG. 11, the network interface 1004 is mainly configured to perform network communication with a server; the user interface 1003 is mainly configured to provide an input interface for the user; and the processor 1001 may be configured to call a device-controlled application program stored in the memory 1005 to:

output navigation route information associated with a navigation user in a navigation interface of a map client application, the navigation interface including map layer information, the navigation route information being superimposed and displayed on the map layer information, and map field information of the map layer information being first field information;

obtain location information of the navigation user on the navigation route information; and update and display the map field information from the first field information to second field information in the navigation interface when the location information is monitored to be in an intersection area on the navigation route information.

It is to be understood that, the computer device 1000 described in this embodiment of this disclosure may implement the descriptions of the map data processing method in the embodiments corresponding to FIG. 3 and FIG. 8, or the descriptions of the map data processing apparatus 1 in the embodiment corresponding to FIG. 10. Details are not described herein again. In addition, the description of beneficial effects of using the same method are not described herein again.

The embodiments of this disclosure further provides a computer-readable storage medium, storing a computer program, the computer program including program instructions, the program instructions, when executed by a processor, implementing the data transmission method provided by the steps in FIG. 3 and FIG. 8. For details, reference may be made to the implementations provided in the foregoing steps in FIG. 3 and FIG. 8, and details are not described herein again.

The computer-readable storage medium may be any internal storage unit of the data transmission apparatus or the computer device described in any one of the foregoing embodiments, for example, a hard disk or a main memory of the computer device. The computer-readable storage medium may alternatively be an external storage device of the computer device, for example, a removable hard disk, a smart memory card (SMC), a secure digital (SD) card, or a flash card equipped on the computer device. Further, the computer-readable storage medium may include both an internal storage unit and an external storage device of the computer device. The computer-readable storage medium is configured to store the computer program and another program and data that are required by the computer device. The computer-readable storage medium may further be configured to temporarily store data that has been output or data to be output.

An aspect of this disclosure provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the descriptions of the map data processing method in the embodiment corresponding to FIG. 3 or FIG. 8. Details are not described herein again. In addition, the description of beneficial effects of using the same method are not described herein again.

In the specification, claims, and accompanying drawings of the embodiments of this disclosure, the terms "first", "second", or the like are intended to distinguish between different objects but do not indicate a particular order. In addition, the terms "including", or any other variant thereof, are intended to cover a non-exclusive inclusion. For example, a process, method, product, or device that includes a series of steps or units is not limited to the listed steps or units; and instead, further Exemplarily includes a step or unit that is not listed, or further Exemplarily includes another step or unit that is intrinsic to the process, method, product, or device.

A person of ordinary skill in the art may be aware that, in combination with examples of units and algorithm steps described in the embodiments disclosed in this specification, this disclosure may be implemented by using electronic hardware, computer software, or a combination thereof. To clearly describe interchangeability between the hardware and the software, compositions and steps of each example have been generally described according to functions in the foregoing descriptions. Whether the functions are executed by hardware or software depends on particular applications and design constraint conditions of the technical solutions. A person skilled in the art may use different methods to implement the described functions for each particular application, but it is not to be considered that the implementation goes beyond the scope of this disclosure.

This disclosure is described with reference to the flowcharts and/or block diagrams of the method and related apparatuses according to the embodiments of this disclosure. Specifically, computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable map data processing apparatus to generate a machine, so that the instructions executed by the computer or the processor of the another programmable map data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable map data processing device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. These computer program instructions may also be loaded onto a computer or another programmable map data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What are disclosed above are merely examples of embodiments of this disclosure, and certainly are not intended to limit the protection scope of this disclosure. Therefore, equivalent variations made in accordance with the claims of this disclosure shall fall within the scope of this disclosure.

What is claimed is:

1. A map data processing method, performed by a computer device, and comprising:
presenting navigation route information associated with a navigation user in a navigation interface of a map client application, wherein the navigation interface presents map layer information, the map layer information includes map field information as first field information, the navigation route information is superimposed and displayed on the map layer information, wherein the map field information comprises a base map tilt, the base map tilt being an angle between a terminal interface of the map client application and a map plane of the map layer information;
obtaining location information of the navigation user in association with the navigation route information; and
when the location information is detected to be in an intersection area on the navigation route information:
calling a base map interface associated with the map client application;
in the navigation interface, adjusting the angle of the base map tilt angle from a first angle in the first field information to a second angle by the base map interface, both the first angle and the second angle being less than 90° and the first angle being less than the second angle; and updating from the first field information to display a second field information associated with the second angle in the navigation interface as the map field information;

wherein the second field information presents additional map data associated with the navigation route information than the first field information, and the map data in the second field information comprising intersection information including road information of the navigation route information after the intersection area.

2. The method according to claim 1, wherein presenting navigation route information comprises:

outputting initial area map data in a first display interface of a map client application in response to a first trigger operation on the map client application, the initial area map data being determined by initial geographic location information where the navigation user is, and the first display interface comprising a location search area;

obtaining destination geographic location information entered in the location search area in response to a second trigger operation on the location search area;

outputting destination area map data associated with the destination geographic location information in a second display interface of the map client application, the second display interface comprising a service control for the navigation user to give navigation instruction;

determining the navigation route information based on the destination geographic location information and the initial geographic location information in response to a third trigger operation on the service control; and outputting the navigation route information in the navigation interface of the map client application.

3. The method according to claim 1, wherein the map field information comprises a field display range;

updating from the first field information to display the second field information associated with the second angle in the navigation interface comprises:

determining the intersection information of a navigation intersection in the intersection area based on the navigation route information;

displaying an intersection display icon corresponding to the navigation intersection and a vehicle icon corresponding to the navigation user in the navigation interface;

determining a road type between the location information and the intersection information based on the vehicle icon and the intersection display icon;

adjusting the field display range from a first display range in the first field information to a second display range on the navigation route information based on the road type; and displaying second field information associated with the second angle and the second display range in the navigation interface.

4. The method according to claim 3, wherein determining the road type between the location information and the intersection information based on the vehicle icon and the intersection display icon comprises:

based on the vehicle icon and the intersection display icon, obtaining an outbound point when the navigation user arrives at the navigation intersection and a navigation direction indicated by navigation route information associated with the outbound point;

when the outbound point belongs to a first boundary of the intersection display icon and the angle between the navigation direction and the first boundary is within a first angle range corresponding to the first boundary, determining the road type between the location information and the intersection information as a first road section type;

when the outbound point belongs to a second boundary of the intersection display icon and the angle between the navigation direction and the second boundary is within a second angle range corresponding to the second boundary, determining the road type between the location information and the intersection information as a second road section type; and determining the first road section type or the second road section type as the road type between the location information and the intersection information.

5. The method according to claim 4, wherein adjusting the field display range from the first display range in the first field information to the second display range on the navigation route information comprises:

when the road type is the first road section type, determining map elements of interest associated with the navigation intersection from the navigation route information, and using icons corresponding to the map elements of interest as display icons of interest;

determining map data, including the vehicle icon, the intersection display icon, and the display icons of interest, as first data to be processed;

obtaining first scale value of a scale corresponding to the first display range in the first field information, and adjusting scale parameter of the scale from a first scale value to a second scale value, the first scale value being greater than the second scale value; and adjusting the first display range in the first field information to the second display range based on the scale corresponding to the second scale value, the second display range being used for completely displaying the first data to be processed.

6. The method according to claim 4, wherein adjusting the field display range from the first display range in the first field information to the second display range on the navigation route information based on the road type comprises:

when the road type is the second road section type, determining map data comprising the vehicle icon and the intersection display icon as second data to be processed; and when the second data to be processed is recognized to be not in a central area of the navigation interface, adjusting orientation of a first display range in the first field information and using the field display range after orientation adjustment as the second display range, the second display range being used for displaying the second data to be processed in the center.

7. The method according to claim 3, wherein the map field information comprises a mobile mode;

displaying second field information associated with the second angle and the second display range in the navigation interface comprises:

using the mobile mode in the first field information as a first mode in the navigation interface, the first mode being used for instructing the map client application to update a map layer of the map layer information when the vehicle icon is fixed in the navigation interface;

calling a base map interface to obtain a mobile strategy associated with the map client application, and changing the mobile mode from the first mode to a second mode based on the mobile strategy, the second mode being used for instructing the map client application to update a position of the vehicle icon when the map layer information is fixed in the navigation interface; and displaying the second field information associated with the second angle, the second display range and the second mode in the navigation interface.

8. The method according to claim 1, further comprising:
changing a map display style corresponding to map elements in the map layer information from a first display style to a second display style when the location information is detected to be in the intersection area, map elements in the second display style being obtained by performing element optimization on map elements in the first display style.

9. The method according to claim 8, wherein the map elements in the map layer information comprise first elements and second elements; and changing the map display style corresponding to map elements in the map layer information from the first display style to the second display style comprises:
calling a base map interface associated with the map client application when the location information is detected to be in the intersection area;
enhancing the first elements in the first display style through the base map interface to obtain enhanced first elements;
weakening the second elements in the first display style through the base map interface to obtain weakened second elements; and
obtaining the map elements in the changed map layer information based on the enhanced first elements and the weakened second elements and using a map display style corresponding to map elements in the changed map layer information as a second display style.

10. The method according to claim 1, further comprising:
when the location information is detected to be coincident with the intersection information corresponding to the intersection area, outputting a navigation sub-interface; and
displaying amplified map data associated with the intersection information in the navigation sub-interface, the amplified map data being obtained by amplifying initial map data associated with the intersection information.

11. The method according to claim 10, further comprising:
when the location information is detected to be not coincident with the intersection information, closing the navigation sub-interface, and generating a display restoring instruction used for restoring the map field information; and
based on the display restoring instruction, restoring the map field information from the second field information to the first field information in the navigation interface.

12. A computer device, comprising:
a processor and a memory, the processor being in communication with the memory, the memory being configured to store a computer program, and the processor being configured to call the computer program, to cause the computer device to perform steps comprising:
presenting navigation route information associated with a navigation user in a navigation interface of a client map application of a user terminal, wherein the navigation interface presents map layer information, the map layer information includes map field information as first field information, the navigation route information is superimposed and displayed on the map layer information, wherein the map field information comprises a base map tilt, the base map tilt being an angle between a terminal interface of the map client application and a map plane of the map layer information;
obtaining location information of the navigation user in association with the navigation route information; and
when the location information is detected to be in an intersection area on the navigation route information:
call a base map interface associated with the map client application;
in the navigation interface, adjust the angle of the base map tilt from a first angle in the first field information to a second angle by the base map interface, both the first angle and the second angle being less than 90° and the first angle being less than the second angle; and
update from the first field information to display a second field information associated with the second angle in the navigation interface as the map field information;
wherein the second field information presents additional map data associated with the navigation route information than the first field information, and the map data in the second field information comprising intersection information including road information of the navigation route information after the intersection area.

13. The computer device of claim 12, wherein the processor is configured to execute the computer program to cause the computer device to present navigation route information by:
outputting initial area map data in a first display interface of a user terminal in response to a first trigger operation on the user terminal, the initial area map data being determined by initial geographic location information where the navigation user is, and the first display interface comprising a location search area;
obtaining destination geographic location information entered in the location search area in response to a second trigger operation on the location search area;
outputting destination area map data associated with the destination geographic location information in a second display interface of the user terminal, the second display interface comprising a service control for the navigation user to give navigation instruction;
determining the navigation route information based on the destination geographic location information and the initial geographic location information in response to a third trigger operation on the service control; and
outputting the navigation route information in the navigation interface of the user terminal.

14. The computer device of claim 13, wherein the map field information comprises a field display range;
the processor is configured to execute the computer program to cause the computer device to update from the first field information to display the second field information associated with the second angle in the navigation interface by:
determining the intersection information of a navigation intersection in the intersection area based on the navigation route information;
displaying an intersection display icon corresponding to the navigation intersection and a vehicle icon corresponding to the navigation user in the navigation interface;

determining a road type between the location information and the intersection information based on the vehicle icon and the intersection display icon;

adjusting the field display range from a first display range in the first field information to a second display range on the navigation route information based on the road type; and displaying second field information associated with the second angle and the second display range in the navigation interface.

15. The computer device of claim 12, the processor is further configured to execute the computer program to cause the computer device to perform steps comprising:

changing a map display style corresponding to map elements in the map layer information from a first display style to a second display style when the location information is detected to be in the intersection area, map elements in the second display style being obtained by performing element optimization on map elements in the first display style.

16. The computer device of claim 15, wherein the map elements in the map layer information comprise first elements and second elements; and the processor is configured to execute the computer program to cause the computer device to change the map display style corresponding to the map elements in the map layer information from the first display style to the second display style by:

calling a base map interface associated with the user terminal when the location information is detected to be in the intersection area;

enhancing the first elements in the first display style through the base map interface to obtain enhanced first elements;

weakening the second elements in the first display style through the base map interface to obtain weakened second elements; and obtaining the map elements in the changed map layer information based on the enhanced first elements and the weakened second elements and using a map display style corresponding to map elements in the changed map layer information as a second display style.

17. A non-transitory computer-readable storage medium, storing a computer program, the computer program being loaded and executed by a processor to cause a computer device with the processor to perform steps comprising:

presenting navigation route information associated with a navigation user in a navigation interface of a map client application of a user terminal, wherein the navigation interface presents map layer information, the map layer information includes map field information as first field information, the navigation route information is superimposed and displayed on the map layer information, wherein the map field information comprises a base map tilt, the base map tilt being an angle between a terminal interface of the map client application and a map plane of the map layer information;

obtaining location information of the navigation user in association with the navigation route information; and when the location information is detected to be in an intersection area on the navigation route information:

calling a base map interface associated with the map client application;

in the navigation interface, adjusting the angle of the base map tilt from a first angle in the first field information to a second angle by the base map interface, both the first angle and the second angle being less than 90° and the first angle being less than the second angle; and updating from the first field information to display a second field information associated with the second angle in the navigation interface as the map field information;

wherein the second field information presents additional map data associated with the navigation route information than the first field information, and the map data in the second field information comprising intersection information including road information of the navigation route information after the intersection area.

18. The non-transitory computer-readable storage medium of claim 17, wherein the computer program being loaded and executed by a processor to cause a computer device with the processor to present navigation route information by:

outputting initial area map data in a first display interface of a user terminal in response to a first trigger operation on the user terminal, the initial area map data being determined by initial geographic location information where the navigation user is, and the first display interface comprising a location search area;

obtaining destination geographic location information entered in the location search area in response to a second trigger operation on the location search area;

outputting destination area map data associated with the destination geographic location information in a second display interface of the user terminal, the second display interface comprising a service control for the navigation user to give navigation instruction;

determining the navigation route information based on the destination geographic location information and the initial geographic location information in response to a third trigger operation on the service control; and outputting the navigation route information in the navigation interface of the user terminal.

* * * * *